United States Patent
Sceats et al.

(10) Patent No.: US 8,951,493 B2
(45) Date of Patent: Feb. 10, 2015

(54) MATERIAL COMPOUND AND A METHOD OF FABRICATING THE SAME

(75) Inventors: Mark Geoffrey Sceats, Gordon (AU); Connor James Horley, Southport (AU); Patricia Richardson, legal representative, Coombabah (AU)

(73) Assignee: Calix Ltd., Gordon NSW (AU)

( * ) Notice: Subject to any disclaimer, the term of this patent is extended or adjusted under 35 U.S.C. 154(b) by 691 days.

(21) Appl. No.: 12/091,035

(22) PCT Filed: Oct. 23, 2006

(86) PCT No.: PCT/AU2006/001573
§ 371 (c)(1),
(2), (4) Date: Jul. 22, 2010

(87) PCT Pub. No.: WO2007/045050
PCT Pub. Date: Apr. 26, 2007

(65) Prior Publication Data
US 2011/0011142 A1    Jan. 20, 2011

(30) Foreign Application Priority Data

| Oct. 21, 2005 | (AU) | 2005905810 |
| Feb. 6, 2006 | (AU) | 2006900546 |
| Mar. 31, 2006 | (AU) | 2006901658 |
| Apr. 18, 2006 | (AU) | 2006901994 |
| May 3, 2006 | (AU) | 2006902293 |
| Aug. 22, 2006 | (AU) | 2006904553 |

(51) Int. Cl.
| C01B 31/30 | (2006.01) |
| B01J 20/04 | (2006.01) |
| B01J 20/34 | (2006.01) |
| C04B 2/12 | (2006.01) |

(Continued)

(52) U.S. Cl.
CPC ............. B01D 53/62 (2013.01); B01J 20/04 (2013.01); *B01D 2257/504* (2013.01); *Y02C 10/08* (2013.01); B01J 20/3483 (2013.01); *B01D 2251/404* (2013.01); *Y02C 10/04* (2013.01); C04B 2/12 (2013.01); *B01D 2253/10* (2013.01); B01J 20/34 (2013.01); C01F 11/18 (2013.01)
USPC .................................. 423/420.2; 423/594.16

(58) Field of Classification Search
USPC .............................. 423/420.2, 593.1, 594.16
See application file for complete search history.

(56) References Cited

U.S. PATENT DOCUMENTS

| 736,869 A | 8/1903 | McTighe |
| 1,634,505 A | 7/1927 | McCaughey |

(Continued)

FOREIGN PATENT DOCUMENTS

| AU | 55715 73 A | 11/1974 |
| AU | 199477474 | 5/1995 |

(Continued)

OTHER PUBLICATIONS

MacIntyre, W.H., Stansel, T.B.; Steam Catalysis in Calcinations of Dolomite and Limestone Fines; 1953; pp. 1548-1555; Industrial and Engineering Chemistry.

(Continued)

*Primary Examiner* — Richard M Rump
(74) *Attorney, Agent, or Firm* — Crain, Caton & James

(57) ABSTRACT

A material compound comprising MgO. $CaCO_3$ as a solid solution of MgO and $CaCO_3$, and a method of fabricating the same.

11 Claims, 7 Drawing Sheets

(51) Int. Cl.
  B01D 53/62 (2006.01)
  C01F 11/18 (2006.01)

(56) References Cited

U.S. PATENT DOCUMENTS

| | | |
|---|---|---|
| 1,798,802 A | 3/1931 | Niles |
| 1,810,313 A | 6/1931 | Hyde |
| 2,015,642 A | 9/1935 | Walker |
| 2,068,882 A | 1/1937 | Walker |
| 2,080,981 A | 5/1937 | Haas |
| 2,113,522 A | 4/1938 | Walker |
| 2,155,139 A | 4/1939 | MacIntire |
| 2,289,329 A | 7/1942 | Prickett |
| 2,784,956 A | 3/1957 | Vogel |
| 2,790,505 A | 4/1957 | Dow |
| 2,992,065 A | 7/1961 | Feustel et al. |
| 3,573,893 A * | 4/1971 | Wadsted ............................. 71/41 |
| 3,684,476 A * | 8/1972 | Wadsted ............................. 71/28 |
| 3,991,172 A | 11/1976 | Wicke et al. |
| 4,017,585 A | 4/1977 | Angevine et al. |
| 4,145,404 A | 3/1979 | Miyata et al. |
| 4,226,839 A * | 10/1980 | O'Neill et al. ................ 423/177 |
| 4,235,425 A | 11/1980 | Beggs et al. |
| 4,299,563 A | 11/1981 | Bryant, II |
| 4,479,920 A | 10/1984 | Dodson |
| 4,673,620 A | 6/1987 | Shulman et al. |
| 4,740,157 A | 4/1988 | D'Agrosa |
| 4,748,010 A | 5/1988 | Walker |
| 4,828,617 A | 5/1989 | Csillag et al. |
| 5,041,333 A | 8/1991 | Conroy |
| 5,122,350 A * | 6/1992 | Bryan ............................. 423/169 |
| 5,167,705 A | 12/1992 | Coughlan |
| 5,211,733 A | 5/1993 | Fukao et al. |
| 5,653,948 A | 8/1997 | Kato et al. |
| 5,769,627 A | 6/1998 | Chisaki et al. |
| 5,779,464 A | 7/1998 | Fan et al. |
| 5,904,750 A | 5/1999 | Cowles |
| 6,103,360 A | 8/2000 | Caldwell et al. |
| 6,200,381 B1 | 3/2001 | Rechichi |
| 6,231,650 B1 | 5/2001 | Mallow et al. |
| 6,280,509 B1 | 8/2001 | Mallow |
| 6,334,894 B1 | 1/2002 | Kostuch |
| 6,783,799 B1 | 8/2004 | Goodson |
| 7,025,940 B2 | 4/2006 | Shah et al. |
| 2004/0194656 A1 | 10/2004 | Mallow |
| 2005/0060985 A1 | 3/2005 | Abanades Garcia et al. |
| 2006/0039853 A1 | 2/2006 | Fan et al. |
| 2006/0093540 A1 | 5/2006 | Fan et al. |
| 2008/0257158 A1 | 10/2008 | Howard |
| 2011/0113957 A1 | 5/2011 | Sceats |

FOREIGN PATENT DOCUMENTS

| | | |
|---|---|---|
| AU | 2002/301717 A1 | 4/2004 |
| DE | 3738301 A1 | 5/1989 |
| EP | 328-051 | 2/1988 |
| EP | 530-940 | 3/1993 |
| EP | 1661460 A1 | 5/2006 |
| FR | 1532049 A2 * | 12/1967 |
| FR | 1532049 | 7/1968 |
| FR | 1532049 A | 7/1968 |
| GB | 339105 | 12/1930 |
| GB | 1207612 A | 10/1970 |
| GB | 1270359 A | 4/1972 |
| GB | 2043219 A | 10/1980 |
| GB | 2043219 A | 10/1980 |
| GB | 2168984 | 7/1986 |
| JP | 2001-026754 | 1/2001 |
| KR | 20010093389 A | 10/2001 |
| KR | 20010093904 A | 10/2001 |
| RU | 1774922 A3 | 11/1992 |
| RU | 2096380 | 11/1997 |
| RU | 2096380 C1 | 11/1997 |
| RU | 2170044 C1 | 7/2001 |
| SU | 1774922 A3 | 11/1992 |
| WO | 9401203 A1 | 1/1994 |
| WO | 97/01615 | 1/1997 |
| WO | 99/05688 A1 | 2/1999 |
| WO | 00/05178 A1 | 2/2000 |
| WO | 00/48709 A1 | 8/2000 |
| WO | 03/085039 | 10/2003 |
| WO | 2005/013695 A1 | 2/2005 |
| WO | 2005/046862 A1 | 5/2005 |
| WO | 2006/043820 A1 | 4/2006 |
| WO | 2007035421 | 3/2007 |
| WO | 2007/045050 A1 | 4/2007 |

OTHER PUBLICATIONS

Office Action; Application No. 200680048244; Feb. 12, 2010; 10 pages.
Office Action; Jan. 26, 2011; Application No. 200680048425.6; 3 pages.
Office Action; Application No. 200780020180.8; Mar. 11, 2010; 8 pages.
Notice of Acceptance; Application No. 2007233570; Nov. 5, 2010; 3 pages.
The Prospects for Carbon Capture and Storage; International Energy Agency; 2004; 252 pages.
C. Henderson; Clean Coal Technology Roadmaps; London, UK 2003; International Energy Agency; pp. 1-2.
Notice of Acceptance; Application No. 2006303830; Nov. 25, 2010; 4 pages.
International Search Report—PCT/AU2006/001568; Dec. 12, 2006; 3 pages.
Written Opinion—PCT/AU2006/001568; Dec. 5, 2006; 4 pages.
Examiner's Report on Application No. 2002301717; Jun. 10, 2009; 3 pages.
McKee; Carbon Sequestration Leadership Forum. Final Draft Technology Roadmap, www.cslforum.org; 2004; 32 pages.
International Preliminary Report on Patentability on PCT/AU2006/001568; Oct. 17, 2007; 14 pages.
Notice of Acceptance AU2006303828; Nov. 5, 2010; 3 pages.
Written Opinion of the International Searching Authority; PCT/AU2006/001572; Nov. 29, 2006; 5 pages.
International Preliminary Report on Patentablility—PCT/AU2007001835; Jun. 3, 2009; 6 pages.
International Preliminary Report on Patentablility—PCT/AU20067000424; Feb. 26, 2008; 3 pages.
International Search Report—PCT/AU20067000424; May 29, 2007; 4 pages.
Written Opinion—PCT/AU20067000424; May 23, 2007; 3 pages.
International Search Report—PCT/AU2007001835; Jan. 11, 2008; 4 pages.
Written Opinion—PCT/AU2007001835; Jan. 3, 2008; 5 pages.
International Search Report; PCT/AU2006/001572; Dec. 13, 2006; 3 pages.
Sawai et al; Quantitative Evaluation of Antifungal Activity of Metallic Oxide Powders (MgO,CaO and ZnO) by an Indirect Conductimetric Assay; J. Applied Microbiology; 2004; vol. 6; pp. 803-809.
First Examination Report; Application No. 1015/MUMNP/2008; Government of India Patent Office, Mumbai, India; Jan. 4, 2012; 2 pages.
First Examination Report; Application No, 1014/MUMNP/2008; Government of India Patent Office, Mumbai, India; Feb. 6, 2012; 1 page.
Gumann, Sina; Supplementary European Search Report; Application No. 06790412.8-1218/ Patent No. 1948565; Jul. 11, 2011; 3 pages; the Hague.
Gumann, Sina; Supplementary European Search Report; Application No. 06804428.8-1218/ Patent No. 1951411; PCT/AU20060011568; Jul. 11, 2011; 7 pages; The Hague.
Abanades, J. Carlos; "Capture of C02 from Combustion Gases in a Fluidized Bed of Ca0"; Aiche Journal, New York, NY, US; vol. 50, No. 7; Jul. 1, 2007; pp. 1614-1622.
Hughes, Robin W. et al.; "Design, process simulation and construction of an atmospheric dual fluidized bed combustion system for in

(56) References Cited

OTHER PUBLICATIONS situ C02 capture using high-temperature sorbents"; Fuel Processing Technology, Elsevier BV, NL; vol. 86, No. 14-15; Oct. 1, 2005; pp. 1523-1531.

Anthony, Edward J. et al.; "Relationship Between S02 and Other Pollutant Emissions from Fluidized-Bed Combustion"; Twenty-Seventh Symposium (International) on Combustion; vol. 27, No. 2; Jan. 1, 1998; pp. 3093-3101.

Evans, S.M., Leksono, T., and McKinnel, P.D.; "Tributylin Pollution: A Diminishing Problem Following Legislation Limiting the Use of TBT-Based Anti-fouling Paints"; Elsevier Science Ltd., Marine Pollution Bulletin; vol. 30, No. 1; Jan. 1995; pp. 14-21.

The Patent Office of the People's Republic of China; Calix Pty Ltd.; Agent: Wu, Xiaonan; Application No. 200680048344.0; A Material Compound and Method of Fabricating the Same; Oct. 9, 2011; 4 pages.

McKenzie, Clyde, Jr; "Use of Quicklime to Increase Oyster Seed Production"; Aquaculture; 10; 1977; pp. 45-51.

Peis, Stefano; EP Examination Report; Jun. 20, 2011; Application No. 07718671.6-1215; 7 pages; Netherlands.

Dick, J.S.; "Compounding Materials for the Polymer Industries"; Noyes Publishing; 1987; pp. 63 and 144.

E. Cremer, Z: Electrochem; vol. 66; pp. 697-702; 1962.

Gumann, Sina; European Examination Report; Application No. 06 790 412.8-1218; European Patent Office, Netherlands; Feb. 3, 2012; 5 pages.

Xiaonan, Wu; The Second Office Action; Application No. 2006800048425.3; The Patent Office of the People's Republic of China, Beijing; Mar. 19, 2012; 6 pages.

Shimizu et al; A twin fluid-bed reactor for removal of CO2 from combustion processes; Department of Chemistry and Chemical Engineering, Nigata University, Japan; vol. 77 Part A; Jan. 1999.

Abanades et al; Conversion Limits in the Reaction of CO2 with Lime; Department of Energy and Environment; 2003; pp. 308-315.

Written Opinion of the International Searching Authority—PCT/AU2006/001573; Nov. 27, 2006; 5 pages.

Written Opinion of the International Searching Authority—PCT/AU20067000424; May 29, 2007; 3 pages.

B.S. Terry et al; Catalysis by Water Vapour of Thermal Decomposition of Calcium Carbonate; Trans Inst. Mining and Metallurgy; 103; 1994; C62-C68.

Wang, Yong et al; The Effects of Steam and Carbon Dioxide on Calcite Decomposition Using Dynamic X-Ray Diffraction; Chemical Engineering Science; vol. 50 No. 9;1995; pp. 1373-1382.

Khinast et al; Decomposition of Limestone: the Influence of CO2 and Particle Size on the Reaction Rate; Chemical Engineering Science; vol. 51 No. 4; 1996; pp. 623-634.

Rothon, Roger Norman et al; Magnesium hydroxide filled EVA: The effects of filler surface modification on the strength of filler/matrix adhesion and the consequences for composite structure and properties; The Journal of Adhesion; vol. 78; Issue 7; 2002; pp. 603-328.

Beruto et al; Use of the Langmuir Method for Kinetic Studies of Decomposition Reactions: Calcite (CaCO3); Feb. 1974; pp. 2145-2153.

Troitzsch; Flame Retardant Polymers; Makromol. Chem., Makromol. Symp.; 74; 1993; pp. 125-135.

Sawai et al; Quantitative Evaluation of Anitfungal Activity of Metallic Oxide Powders (MgO,CaO and ZnO) by an Indirect Conductimertric Assay; Journal of Applied Microbiology; 2004; 96; pp. 803-809.

Sawai et al; Evaluation of Growth Inhibitory Effect of Ceramics Powder Slurry on Bacteria by Conductance Method; Journal of Chemical Engineering of Japan; 1995; vol. 28 No. 3; pp. 288-293.

E.A.M.: Youssef; Characterization, Surface Modification, and Evaluation of Egyptian Dolomite Ore as an Extender Pigment for Paint; Pigment & Resin Technology; 2002; vol. 31 No. 4; 226-233.

Knibbs; The effect of Steam on Calcination; Lime and Magnesia; pp. 102-104; London, Ernest Benn, (1924).

Schilling, Karl; Recent Experiences in the Treatment of Dringking Water with the Magno Filter; Vom Wasser 1937; vol. 12.

D.P. Butt, et al;Kinetics of Thermal Dehydroxylation and Carbonation of Magnesium Hydroxide; J.Am.Ceram.Soc,; 1996; 79; 1892-1898.

J.E. Readman, et al; The use of in situ Powder X-Ray diffraction in the Investigation of Dolomite as a Potential Reversible High-Temperature CO2 Sorbent; Phys. Chem. Chem. Phys.; 2005; 7; 1214-1219.

Satterfield, et al.; Kinetics of the Thermal Decomposition of Calcium Carbonate; A.I. Ch. E Journal; vol. 5 No. 1; pp. 115-122; (1959).

Written Opinion of the International Searching Authority—PCT/AU2007001835; Jan. 11, 2008; 5 pages.

Gregory A. Wilson, Non-Final Office Action, U.S. Appl. No. 12/295,468, Jul. 23, 2013, 9 pages, United States Patent and Trademark Office, Alexandria, VA, USA.

International Search Report—PCT/AU2006/001573; Nov. 27, 2006; 3 pgs.; Patent Cooperation Treaty; Australian Patent Office; Woden Act, Australia.

International Preliminary Report on Patentability—PCT/AU2006/001573; 4 pgs.; Patent Cooperation Treaty; Australian Patent Office; Woden Act, Australia, 2006.

Beruto, D.T., Vecchiattini, R. & Giordani, M.; Effect of Mixtures of H20(g) and CO2(g) on the Thermal Half Decomposition of Dolomite Natural Stone in High CO2 Pressure Regime; Thermochimica Acta; 2003; pp. 25-33; vol. 404.

Beruto, D.T., Vecchiattini, R. & Giordani, M.; Solid Products and Rate-Limiting Step in the Thermal Half Decomposition of Natural Dolomite in a CO2(g) Atmosphere; Thermochimica Acta; 2003; pp. 183-194; vol. 405.

Schilling, Karl; Chemical Abstract (AN 1938:45780)-Recent Experiences in the Treatment of Drinking Water with the Magno Filter; 1937; pp. 41-74; vol. 12.

Jones, Christopher; Non-Final Rejection; U.S. Appl. No. 12/091,040; Jan. 18, 2013; 13 pages; United States Patent and Trademark Office; Alexandria, US.

Jensen, William P.; Amendment and Response to Office Action dated Jan. 18, 2013; Jul. 18, 2013; 14 pages; Crain, Caton & James; Houston, US.

Eigen, H. et al; Manufacturing Half-Decarbonised Dolornite with Active MgO in a Rotary Kiln; Zement-Kalk-Gips; 1995; pp. 44-47; vol. 8(2).

Patre, A T; Hearing Notice in Reference to Application No. 1014/MUMNP/2008; Dec. 30, 2013; 2 pages; Intellectual Property India; India.

Eigen, H. et al; Manufacturing Half-Decarbonised Dolomite with Active MgO in a Rotary Kiln; Zement-Kalk-Gips; 1955; pp. 44-47; vol. 8(2).

\* cited by examiner

MATERIAL COMPOUND AND A METHOD OF FABRICATING THE SAME

FIELD OF INVENTION

The present invention relates broadly to a material compound and to a method of fabricating the same. The invention also relates to uses of the material compound as a cementatious component of a cement, a fertilizer, and a sorbent.

BACKGROUND

Magnesium and/or calcium based particles or granules are widely used in a number of applications, including in cements, fertilizers, and sorbents.

Most commonly used cements are formed with calcium as the elemental basis for the cementitious component, generally in the form of lime, CaO. These cement formulations include lime, Portland cement, and Portland type blended cements such as Portland-slag cements and Portland limestone cements. Portland cement is produced from ground clinker, and clinker is a sintered mixture of ground lime and argiciilaceous components ($SiO_2$, $Al_2O_3$, and $Fe_2O_3$) from clay, shale, marl, tuff, ash phyllite and slate, mixed in proportions to provide a network with compositions $3CaO.SiO_2$ (50-70%), $2CaO.SiO_2$ (15-30%), $3CaO.Al_2O_3$ (5-10%) and $4CaO.Al_2O_3.Fe_2O_3$ (5-15%).

The hydration of such calcium based cements produce an excess of Portlandite, $Ca(OH)_2$. Portlandite has a high solubility, and thus has a mobility and reactivity that is known to result in poor quality cements, unless otherwise suppressed. For good cement, the excess Portlandite is reacted, most usually with activated Pozzolans. Upon setting, the calcium is then locked into low solubility compounds, and strong cements are produced. Many formulations of good calcium based cements are now understood to be those that minimise Portlandite during hydration. There are other requirements for good cement—for example, small volume changes on setting, uniform setting rates of the cementitious components, and these are achieved through the choices of binders, fillers, accelerators and the like. However, an essential challenge of good calcium based cement formulations is to match the activity of the Pozzolans so as to consume the Portlandite. This restriction limits many formulations of calcium based cements.

On the other hand, the equivalent magnesium based cements, where they can be made, do not have the same fundamental problem as calcium based cements because Brucite, $Mg(OH)_2$ is insoluble, and does not migrate or readily react. However, many of the earlier magnesia based cements, such as the Sorrel cements, have poor resistance to water degradation because they use magnesium oxychloride and magnesium oxysulphate, as the cementitious component, and the chloride and sulphate ions are responsible for the poor properties. These materials were used in cements because reactive (caustic) magnesia MgO was then not readily available. The calcination of magnesium carbonate in conventional kilns yielded dead-burned magnesia in which the reactivity had been reduced by sintering, and had a poor reactivity in cements, similar to the mineral Periclase. Periclase hydrates slowly, and is not a desirable component for cements. It was the difficulty of obtaining reactive magnesia on an industrial scale that lead to the development of the Sorrel cements.

Magnesia based cements generally require additional additives, such as sodium silicate because the hydrate itself does not have sufficient anions to form a gel that sets. Thus rapid setting magnesia based cements are used in many applications (repairs etc) and have complex formulations.

Reactive magnesia, sometimes called caustic magnesia, can now be produced by careful calcination, and is understood to produce excellent cements. The lower solubility, by five orders of magnitude, of Brucite compared to Portlandite means that there can be a greater diversity of cements possible when magnesium is used instead of calcium because the constraint of solubility is lifted. That is, formulations of these cements do not require that the Brucite is consumed. Magnesium based cements have other properties that make them desirable, for example they are lightweight and with a low thermal conductivity, with these being properties that are largely a property of the magnesium ion in such materials.

While magnesium based cements may have desirable properties, the deposits of the mineral magnesite $MgCO_3$ are limited, and the cost of extraction of magnesia from brine is expensive. That is, magnesium based cements cannot generally compete with calcium based cements on price, except for niche applications There exist mixed calcium and magnesium based cements. For example, the excess Portlandite in Portland cements can be consumed by using reactive magnesia, which forms insoluble Brucite $Mg(OH)_2$. The amount of magnesia required to achieve this formation can be relatively small, and these cements have many desirable properties.

Despite the many common properties of calcium and magnesium based cements and their mixtures, there are very few cement formulations that are produced from calcined dolomite. Dolomite is a plentiful mineral, with a crystalline structure based on units of $MgCO_3.CaCO_3$. The structure consists of layers of strictly alternating $CaO_6$ and $MgO_6$ octahedra with carbonate layers sandwiched between them. That is, the calcium and magnesium ions are in close proximity in the crystal structure. Dolomite can be completely calcined in conventional kilns to give a material, Dolime (MgO+CaO), which is comprised of microcrystallites of magnesia (MgO) and lime (CaO). The phase separation of MgO and CaO is a consequence of thermodynamics, namely that crystals of MgO and CaO have a lower free energy than a crystal MgO-.CaO in which the magnesium and calcium are together in the unit cell of the crystal. Cements based on Dolime are not satisfactory because the magnesia microcrystals sinter to Periclase during calcination, which is unreactive, and hydrates more slowly than the lime.

Cements based on partially calcined dolomite are described by Rechichi (U.S. Pat. No. 6,200,381) in which dolomite is partially calcined to a mixture of calcium carbonate and partially calcined magnesium oxide. It is understood that such partial calcination produces a mixture of MgO and $CaCO_3$ microcrystals (J. E. Readman and R. Biom Phys. Chem. Chem. Phys 2005, 7, 1214-1219). Rechichi demonstrated the equivalent of making the same cement from a mixture of separately partially calcined MgO and limestone granules. These mixture-based cements, often with additives such as inorganic salts (acids, magnesium sulphate, and aluminium sulphate) have many desirable properties and applications, which include the ability to use organic materials and many other materials as binders, and the use of sea water in the setting process. In the cements based on these mixtures, however, the $CaCO_3$ acts largely as filler and the benefits of using dolomite feedstock are not clear. The cements are not substantially different from those made from partially calcined MgO.

It has been demonstrated in the laboratory that experimental conditions can be found in which the dolomite decomposes at 640-700° C. into a mixture of a solid solution of MgO and $CaCO_3$ and MgO and $CaCO_3$ microcrystals, with considerable sintering of MgO. (D. T. Beruto, R. Vecchiattini and M. Giordani, Thermochim. Acta 2003, 404, 25 (2003)). In later work they were able to produce this material under high pressure of CO2 in a Knudsen cell. (D. T. Beruto, R. Vecchiattini and M. Giordani, Thermochim. Acta 405, 183 (2003)). The solid solution was identified as an intermediate in the high temperature thermal decomposition of dolomite to MgO and $CaCO_3$ microcrystals, and no conditions were identified to produce the pure solid solution. Under the experimental conditions, the sintering of the materials would give low reactivity, There has been no means of manufacture described for this material on an industrial scale.

All the cements above—calcium, magnesium and mixed calcium/magnesium—react with carbon dioxide ($CO_2$) in a carbonation process that is the reverse of calcination. The carbonate ions produced by carbonation have stronger bonds that than the hydroxides, so that the cement strength will, in certain circumstances, increase over time as carbonation takes place. However, carbonation of cement develops from the exposed surface to give an inhomogeneous material, and volume changes can induce the development of stresses. This can lead to deterioration of the cement over time with carbonation. Cements can be formulated so that the volume change is small, or the carbonation is slow. However, this requirement also limits cement formulations The impact on greenhouse emissions from cement manufacture is significant, with over 3% of anthropogenic emissions coming from this source. The release of $CO_2$ during calcination and its slow recapture by carbonation means that the $CO_2$ released impacts on global warming. Only a small fraction of cement re-carbonates quickly because the majority of cement is too far from an exposed surface. Only about 40% of the $CO_2$ liberated during calcination can be re-carbonated in optimal circumstances. For example for Portland cement, the high temperatures used to make cement clinker lead to ~100% calcination.

For cements produced from lime slurry, the use of partially calcined lime granules in the slurry leads to a phase separation into granules of Portlandite $Ca(OH)_2$ and calcite $CaCO_3$, and the calcite is incorporated into the cement as filler. There is no net advantage in greenhouse emissions because the calcite replaces other fillers, and there is no emissions savings. The high solubility of Portlandite is responsible for the phase separation of the partially calcined lime during hydration. It is noted that careful control of calcination of limestone can produce a material in which 50% partial carbonation is achieved, namely $CaO.CaCO_3$. This material phase separates into Portlandite and calcite as described above, when hydrated.

For magnesia based cements, the partial calcination of magnesite granules can be achieved, but this is inhomogeneous as the calcination proceeds from the granule surface inwards. The low solubility of Brucite and magnesite is such that this separation is retained in the hydration process, and the cement is similar to magnesia based cement that uses magnesite as filler. There is no net advantage in greenhouse emissions because the magnesite replaces other fillers, and there is no emissions savings. The low solubility of Brucite is responsible for the poor mixing during hydration.

In summary, there has been no practical cement manufacturing process for calcium or magnesium based cements that can take the advantages of the greater strength of a carbonate matrix and a reduction in greenhouse gas emissions. Cements generally required additional materials, such as Pozzolans and soluble silicates, to provide anions required for a strong matrix.

Ideally, on a volume basis, the energy used in calcination and the heat given off in forming cement should be minimised. The release of heat during formation of slurry and/or in mixing and setting is a measure of the energy imbalance in the formation of cements. A reduction of the energy demand would be beneficial with regard to cost of production. If the hydration and setting is done in a single step, as in Portland cement, the temperature rise can cause strains in the cement when it cools. To minimise the energy inputs of calcinations, an existing technique is to reduce the amount of cementitious material by fillers. The use of partially calcined materials, does not work for either lime or magnesia, as mentioned above. Carbonation of calcium and magnesium based cements is a further indication that the thermodynamics of these cement formulations is not optimised. That is, many cement formulations, after setting, have too high a free energy and are chemically unstable.

In relation to fertilisers, magnesium deficiency of soils is a widespread problem, and commonly occurs in acidic soils. The magnesium deficiency is often dealt with by using ground dolomite, but it is understood that the beneficial effects do not appear because of the low solubility of the dolomite. In acid soils, the addition of a basic material, such as lime, has the beneficial effects of increasing the pH and unlocking essential nutrients from the soil. It is understood the use of magnesia, or hydrated magnesia, can provide both the magnesium and the acid neutralization. However, magnesia is often produced as Periclase, which is sintered and unreactive. For example, Periclase only slowly hydrates to Brucite. Reactive magnesia is not common, and is believed to be too expensive. Heating dolomite in conventional kilns also leads to an unreactive Periclase.

In relation to sorbents, lime and hydrated lime are widely used as sorbents in industrial applications, and use calcium as the active element. There are a number of applications in which magnesium has more desirable properties—for example, in some processes that require a reversible process, the binding of compounds to calcium is too strong, and the temperature of the reverse reaction (eg calcination) is considered to be too high. Generally, magnesium has a lower binding energy than calcium, leading to a lower temperature to reverse the binding. Even where magnesium is preferred, the cost of magnesia may be too high.

In relation to sorbents, particularly for sulphur and carbon capture, the use of calcined limestone as a sorbent has been well studied. The reactivity of sorbents scales with the surface area and pore sizes. Small pore sizes, namely micropores <2 nm tend to clog with sorbate, and the rapid sorption efficiency plateaus. There is a longer process in which the sorbate diffuses through the granules, but this is not generally used commercially. It is understood that in materials produced by conventional calcination, the surface area and pore sizes are reduced by sintering and the reactivity is reduced. It is now also understood (J. C. Albandades and D. Alvarez, Energy and Fuels, 2003, 17, 308-315) that it is desirable to produce sorbents that have not only a high surface area, but also a high mesoporous volume, with mesopores being about 5-20 nm diameter. Mesopores are less prone to dogging, and these materials have a high degree of fast sorption. Fan and Gupta (U.S. Pat. No. 5,779,464) describe the fabrication of a high mesoporous "super sorbent" from limestone using the process of calcining limestone to lime, forming a hydrate and dissolving the calcium, and precipitating small calcium carbonate particles and calcining these particles. For many price sensitive industrial applications of sorbents, such as carbon capture, the process steps described by Fan and Gupta will add a cost that may make their "super sorbent" too expensive.

There are advantages in developing a magnesium based sorbent derived from magesite or dolomite because the energy and temperature requirements for the calcination re-processing are significantly reduced, without loss of the degree of binding required. In many applications in which reversible sorption is required, the magnesium material is preferred over calcium because the enthalpy of desorption is lower with the magnesium reaction than the calcium reaction. Thus, the temperature of decomposition of $CaCO_3$ to $CaO$ (calcination) is about 895° C. whereas that for $MgCO_3$ to $MgO$ is about 395° C. Further, the enthalpy of the reaction with the magnesium is smaller than that of the calcium. In many industrial processes, these are significant differences. However, many experiments on the use of MgO as a sorbent show a limited degree of adsorption because the morphology of the MgO materials. Firstly, MgO produced by calcination is generally sintered, so that the surface area is not large and the sorption capacity is low. And secondly, the micropores in the surface of MgO (ie <10 nm) readily clog with the adsorbed material such that penetration of the sorbate into the granule is restricted. For example, magnesium oxide slurry is limited in its sorption properties by pore clogging (D. P. Butt, et al J. Am.Ceram. Soc. 1996, 79, 1892-1898 (1996)). As a consequence, the initial rapid adsorption onto the available surface saturates at a low level because of the low surface area, and a slower process takes place in which the sorbate has to diffuse through the material. Only the initial rapid reaction is of industrial interest. As a consequence, CaO is generally preferred as a sorbent over MgO.

It has been established that calcined dolomite is a sorbent for many materials, such as carbon dioxide and sulphur dioxide, in many applications in which lime and or magnesia having a high surface area may be generally used. Dolime is produced by the slow calcination of dolomite at high temperatures (>900° C.) is known to produce microcrystallites of MgO+CaO, and the sorption properties of this material are dominated by the CaO microcrystals because the MgO microcrystals are strongly sintered and unreactive. This material may have a similar reversible sorption properties as lime (J. Readman and R. Blom, Phys Chem Chem Phys, 2005, 7 1214-1219). The slow partial calcination of dolomite at temperatures below 700° C. yields $MgO+CaCO_3$ microcrystals, and the sorption properties of this material are similar to that of MgO described above, and is generally a poor sorbent. The $CaCO_3$ plays little role.

Thus there currently exists no magnesium based "super-sorbent", based on either calcined magnesite or dolomite that can take advantage of the preference for magnesium based sorption compared to calcium based sorption.

A need therefore exists to provide a material compound and a method of fabricating the same which, seek to address at least one of the above-mentioned problems.

SUMMARY

In accordance with a first aspect of the present invention there is provided a material compound consisting of a single phase of $MgO.CaCO_3$ as a solid solution of MgO and $CaCO_3$.

The compound may be hydrated.

The hydrated material compound may comprise $Mg(OH)_2$. $CaCO_3$ as a solid solution of $Mg(OH)_2$ and $CaCO_3$.

In accordance with a second aspect of the present invention there is provided the use of the material compound as defined in the first aspect as a cementatious reactant of a cement.

In accordance with a third aspect of the present invention there is provided the use of the material compound as defined in the first aspect as a fertilizer.

In accordance with a fourth aspect of the present invention there is provided the use of the material compound as defined in the first aspect as a sorbent.

In accordance with a fifth aspect of the present invention there is provided a method of fabricating a material compound consisting of a single phase of $MgO.CaCO_3$ as a solid solution of MgO and $CaCO_3$.

The method may comprise the steps of providing a feedstock, the feedstock comprising granules of a size distribution of between about 40 microns to about 125 microns; moving the granules through a retort chamber under gravitational forces as a granular flow; providing heat to the granules inside the retort chamber through heat transfer through the wall of the retort chamber; introducing superheated steam into the retort chamber to create conditions of a gas-solid multiphase system; and flushing gas products from the retort chamber under the flow of the superheated steam from one or more inlets to one or more exhaust openings formed in the retort chamber; and cooling the granules exiting from the retort chamber such as to quench phase separation.

The method may further comprise imparting at least horizontal forces on the granules moving through the chamber such that the granules are moved towards the wall of the retort chamber for facilitating the heat exchange to the particles through the wall of the retort chamber.

The method may further comprise imparting at least the horizontal forces such that turbulent mixing of the superheated steam and the granules is facilitated.

The method may further comprise separating of the superheated steam from the granules prior to the superheated steam exiting the retort chamber through the exhaust openings.

The calcination reaction may occur at a temperature of about 450 to 650° C.

A residence time of the feedstock in the retort may be of the order of seconds.

The method may further comprise providing a pumping action to facilitate an exhaust flow from the retort chamber through the exhaust openings.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
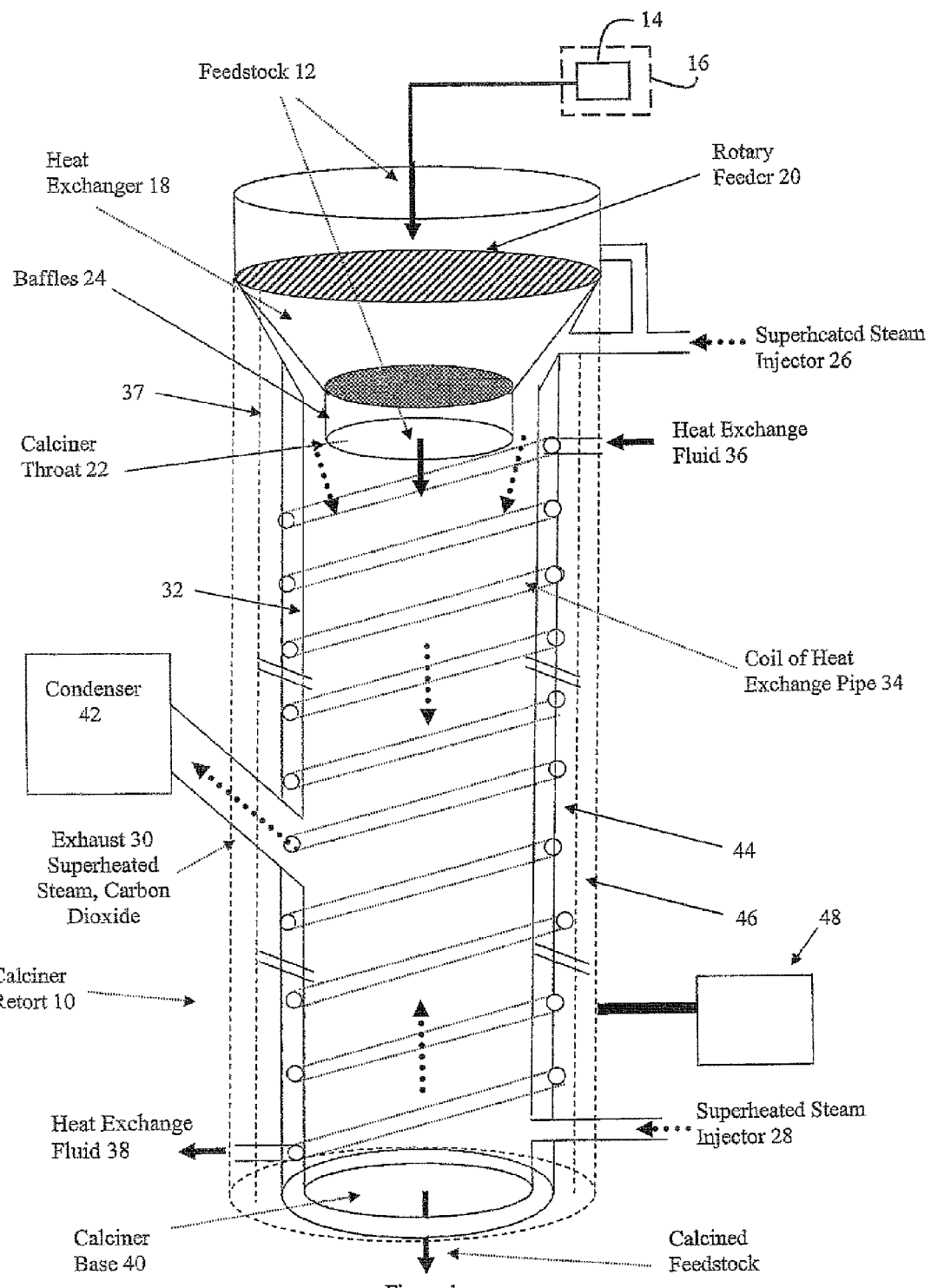
FIG. 1 shows a schematic vertical cross-sectional drawing of a calciner for production of the semidolime material according to an example embodiment.

The described processes for manufacture and uses of a material, namely semidolime material $MgO \cdot CaCO_3$ which is to be understood as a solid solution of MgO and $CaCO_3$, in contrast to a phase separated material $MgO+CaCO_3$ Most dolomites are found in a form in which the material contains excess magnesite or calcite, generally reflecting the degree of the geologic process that is believed to transform limestone, to dolomite to magesite through the dissolution of calcium ions and replacement by magnesium ions through contact with brine. The material will be referred to herein with use of the trademark "semidolime" provided that the dominant mineral is dolomite. It is understood that reference to the new material using the trademark semidolime in the provided description is not to be viewed as making that name a generic description of the new material. The fabrication process described herein is based on a separation of the time scales for a superheated steam-catalysed calcination reaction to drive out the carbon dioxide and the time scale for phase separation and sintering with rapid quenching, such that a pure solid solution is produced instead of a phase separated, sintered mixture of the solid solution with microcrystals of MgO and $CaCO_3$.

The semidolime material hydrates to form $Mg(OH)_2 \cdot CaCO_3$ which is also understood to be a solid solution of $Mg(OH)_2$ and $CaCO_3$. The tendency for a solid-solid phase separation in semidolime and $Mg(OH)_2 \cdot CaCO_3$ is suppressed by the processes described herein, and the result is a homogeneous solid solution. These described processes disclose how to make semidolime material $MgO \cdot CaCO_3$ from rapidly calcining dolomite in the presence of superheated steam. While superheated steam calcination of dolomite was disclosed in the scientific literature before 1956, a reactor that can be used to rapidly manufacture the material has not previously been disclosed. The described processes set out the conditions for producing granules that have both a high reactivity (high surface area) and which minimise the phase separation to $MgO+CaCO_3$ microcrystals. Both of these conditions are preferably met for semidolime material to display the beneficial properties that are described for example embodiments. The described reactor design is one in which both the residence time and the reaction time are reduced to the timescale of seconds, and the preferred embodiment is one in which these conditions are met in the gravitational fall through a calciner under conditions of granular flow that facilitate a rapid heat transfer from the calciner walls, and a reduction of the carbon dioxide partial pressure so as to suppress the back reaction.

In producing semidolime material from dolomite, phase separation is suppressed in the described example at high temperature by using a very fast calcination reaction which is complete in several seconds, so that the degree of phase separation at high temperature is minimised. Once the material is cooled, the material is structurally and chemically stable. Furthermore, the semidolime material is reactive because of not having had time to sinter (and lowering of surface area). In conventional kilns, the processing time is very long, and the MgO and $CaCO_3$ phase separate and ultimately the MgO sinters (dead-burns) to have poor reactive properties similar to Periclase. By reducing the calcination time, the degree of phase separation at high temperature is reduced.

It is noted that partial phase separation may to some level occur, but any such partial phase separation is not observable on the micron scale. The preferred embodiment of producing semidolime material is to use a superheated steam catalysed calcination of dolomite that has been ground to less than about 125 micron diameter, at a temperature of about 414° C. in a calciner that has a residence time of several seconds. The superheated steam catalyses the chemical reaction, and also affects the change in the morphology of the granule. The calcination of dolomite granules in the absence of superheated steam and in a high carbon dioxide partial pressure is limited by the transport of $CO_2$ from the granule. The conditions for rapidly calcining dolomite preferably provide a reduction of the $CO_2$ partial pressure during calcination to suppress the back reaction. In the preferred embodiments, the back reaction is suppressed through the combined effects of superheated steam injection, the natural exhaust processes, and pumping of the calciner by the effects of superheated steam condensation and mechanical pumping of the calciner.

In the hydration process, a solid-solid phase separation is suppressed by the low solubility of $Mg(OH)_2$. In the slurry, the magnesium keeps the pH of the aqueous phase at a high level, namely about 10.52, and this suppresses the solubility of the calcium ion because the dissolution pathway through the formation of bicarbonate ions is suppressed. This low solubility of both $Mg^{2+}$ and $Ca^{2+}$ in the semidolime closes down the mechanism of phase separation, so the slurry is comprised of material in which the degree of phase separation is also minimised. Thus the slurry, under normal conditions, is chemically and structurally stable.

These two mechanisms of the embodiments described above can set the basis for new classes of cements:—

In a first class of cements, granules of an activated Pozzolan are added to the slurry with fillers. The alkaline slurry reacts with the activated Pozzolan in an acid-base reaction which dissolves both the hydrated semidolime material and the Pozzolan to form a gel containing silicate (and/or aluminate ions) released from the Pozzolans, and magnesium, calcium, hydroxyl and carbonate ions released from the semidolime material, and the gel sets in the same manner as understood in the art of calcium and magnesium based cements. The reaction that dissolves the magnesium and calcium also draws out the carbonate ion into the gel, and the gel sets with carbonate as an integral part of the matrix. Thus the cement matrix is pre-carbonated. The gel is essentially homogeneous with respect to the distribution of calcium, magnesium and carbonate ions, and this homogeneity is the source of the strong binding of the cement. Additional carbon dioxide can be injected into some of these cement formulations during setting without deleterious effects. The water used to form the slurry may be sea water, brine or brackish water.

In a second class of cements, an acid such as sulphuric acid, uric acid, citric acid, acetic acid, glycolic acid, oxalic acid, and other di- or polycarboxylic acids, or other acidifying agents can be added to the hydrated semidolime material slurry, with fillers. The acid lowers the pH to release the magnesium, calcium and carbonate ions to form the cement matrix. The presence of the carbonate ion is such that a settable gel is formed, giving a strong cement. These cements are stronger than those formed by the reaction of slaked lime or magnesia with acid, because of the participation of the carbonate ions in the gel. They are also stronger than cements made from partially slow-calcined dolomite or mixtures of magnesia and limestone, because the carbonate from the limestone microcrystals/granules is not totally accessible for the cementatious matrix.

The common benefit of the cements formed by the use of semidolime material in the example embodiments is that the cements are pre-carbonated, and are strong stable cements. The set cements are not subject to weathering by either the reaction with carbon dioxide (because of saturation) or with water (because of the low solubility of magnesium). The described cement is characterised in that the magnesium, calcium, and carbonate are distributed evenly throughout the cement matrix, because those constituents are in close proximity in both the $Mg(OH)_2.CaCO_3$ and $MgO.CaCO_3$ precursors. The described cements cannot be formed by mixing hydrated magnesite and limestone granules because the suppression of dissolution by the $Mg(OH)_2$ inhibits the development of a uniform phase, and the cements that are formed from these granules are not as strong, with the limestone being incorporated as filler. The uniformity of the precursors produced by the rapid calcination described not only gives rise to a uniform strength, but also leads to a small distribution of setting rates for the cement, thereby minimising the creation of stresses during setting.

The cementitious matrix can also be formed by using semi-dolime material with other cementitious materials such as magnesia, Portland cement and polymers. For example, the semi-dolime material has the same attributes as magnesia in reducing the formation of Portlandite in formulations with Portland cement and lime. magnesia also conveys many benefits when used with semi-dolime material, and in practice, the feedstock that is used in the reactor to produce semi-dolime material from dolomite also can contain magnesite, which calcines in the reactor along with the dolomite. Further, limestone granules, as impurities in the ground minerals, pass through the reactor and are incorporated as filler in the matrix, as are silica granules. Given that dolomite is mined in grades that may contain significant amounts of magnesite, limestone and silica, their impact on the process and the cement is relatively small in the described processes. Thus the specification of the dolomite feedstock can be broadly defined to mean dolomitic minerals. However, it is understood that if there are too many impurities, such as silica, that are incorporated into the dolomite microcrystals as chemical impurities, then the efficient calcination of dolomite may be impaired. If there is an excess of magesite, the degree of pre-carbonation can be enhanced by bubbling carbon dioxide into the slurry.

An advantage of pre-carbonation is that the slurry has the necessary cations ($Mg^{2+}$, $Ca^{2+}$) and anions ($CO_3^{2-}$, $OH^-$) to form a strong setting cement, thereby bypassing the need for additives such as activated Pozzolans or soluble silicates.

The described cements have the common benefit from the additional strength that arises from pre-carbonation, but also the beneficial properties of the magnesium cements—low solubility, low thermal conductivity, low density and low coefficient of thermal expansion. These properties are modified by the fillers that are used, and in the case of compressible fillers such as biomass, the setting of the cement can occur in presses.

The surfaces of the described cements formed using semi-dolime material are already carbonated and inert, so that the effect of weathering is greatly reduced. The combined effects of the low solubility magnesium and the carbonation result in an excellent stability. An important difference between calcium based cements and magnesium based cements is associated with the higher solubility of the calcium in water compared to magnesium at typical pH values of the water. The leaching of calcium based cements by ground and sea water is well documented, and is believed to be the mechanism of formation of dolomite through the replacement of calcium by magnesium from brine on geological timescales. Generally, magnesium based cements will have a lower leaching rate with water than a calcium cement of the same formulation. Otherwise, there are many similarities. Thus many cement formulations can be made that are based on mixtures of magnesium and calcium cementitious materials.

The presence of a high fraction of magnesium confers upon the described cements the benefits of a low thermal conductivity, and a mechanical stability to large temperature variations, including a low thermal expansion. These are characteristics of magnesium cements.

Even with a high percentage of flammable fillers, such as biomass, the cement is inflammable and stable, and the semi-dolime is non-toxic.

There are some features of the described semidolime material cement formulations that mass limit their use in place of their calcium based equivalents. For example, the matching of the thermal expansion of certain Portland cement formulations to that of steel is not readily achieved. In this respect, however, many of the cement formulations described herein have strength and weathering properties that enable alternative construction methods to be deployed. In general terms, it is understood that a building will have a longer lifetime, and less maintenance if it is made from materials that have low thermal expansion and low weathering.

The acceleration of the setting rate of the described cements based on the semidolime material can be managed using the same principles that apply to calcium and magnesium cements. Some formulations can set so quickly that the build up of heat from the hydration can cause unwanted stresses when the material sets. The setting time can be controlled by a limited degree of sintering (without engendering significant phase separation), by reducing the surface area by changing the calcination conditions, or by separation of the steps or hydration of the semidolime material and mixing/setting in a cement formulation.

The temperature rise on hydration and setting of cements is determined by the rate of energy released, principally by hydration of the cementitious material. This is a recovery of the heat used to calcine the material. Based on the standard enthalpies of hydration of lime and semidolime material (as estimated from magnesia), the hydration of semidolime material releases about 26% of the heat as does lime on a volume basis, because the calcium site is not calcined in the semidolime material and the enthalpy of hydration is much lower. Direct comparisons are difficult to make because the hydration reaction rate is generally transport limited and determined by many materials properties, but the heat energy density liberated by the complete hydration of semidolime material compared to lime will also be reduced by about 74% for the same hydration reaction rate, and the temperature rise will also be reduced. There is a linkage between the propensity for calcium and magnesium cements to re-carbonate with increased strength, and the proposition that lime and magnesite do not have the optimal thermodynamic energetics for cement. That is, more energy is used in calcination of these materials than is necessary to make a strong cementitious material, and this excess energy is released first by the fast process of hydration, leading to an unnecessary temperature rise, and second by the slower process of carbonation. Semi-dolime material has better energetics, and the uniform chemical composition distributes this capacity uniformly through the cementitious material to facilitate the setting process.

Most magnesium and calcium based cements slowly capture $CO_2$ from the atmosphere, and this carbonation is known to strengthen the cement in ideal conditions. This arises from the stronger metal carbonate binding compared to metal hydroxide binding. This gives the described cements greater strength when compared to un-carbonated equivalents.

There are also environmental and cost benefits that arise from the use of the described cements. The release of carbon dioxide from the manufacture of cement is responsible for about 3% of the anthropogenic emissions of carbon dioxide, of which about 60% come from the release of $CO_2$ during calcination, with the remainder coming from the burning of fuel to provide the energy for the process. For Portland cement, additional energy is used to sinter the clinker. When semidolime material is made, only 50% of the $CO_2$ is removed, and the remaining materials all contribute to the cementitious matrix. Indeed, it is the incorporation of the remaining 50% of the $CO_2$, as carbonate, that gives the cements their greater strength. It was described above that this reduction could not be obtained, for example, by using partly calcining lime or magnesite, or by mixing magnesia and limestone. It is a property advantageously rendered by semidolime material because of the chemical uniformity of the precursors. Therefore, a significant environmental benefit of the use of semidolime material is to reduce $CO_2$ emissions from calcination by 50% on a volume basis of product. Such formulations could lead to a reduction of carbon taxes or the granting of carbon credits. In addition, the calcination process as described herein produces an exhaust of $CO_2$ and superheated steam, which after condensation of the superheated steam, the $CO_2$ can be compressed and sequestered. Thus, 100% of the carbon dioxide produced by calcination can be sequestered, leaving the only emissions being those that arise from the burning of the fuel.

As energy costs increase, there is an energy saving which results from the use of semidolime material. If the subtle differences between magnesium and calcium cements of the same formulation are ignored for a general comparison, then the energy cost per unit volume of semidolime material compared to lime is reduced by 33% because only 50% of the $CO_2$ is removed and the enthalpy of calcination of dolomite to semidolime material is less than that of lime.

Conceptually, for example, calcium based cements consume considerable energy to remove all the $CO_2$, and over time this energy is released firstly by the hydration, and secondly by the very slow carbonation. The benefit of using semidolime material compared to lime, produced by conventional calcination, in cements is that the semidolime material production process leads to both energy savings and savings arising from carbon emissions reductions.

The embodiments described above also have applications in fertilisers and sorbents. The release, reactivity or mobility, of magnesium in granules typically requires a material having a high surface area and a uniform distribution of magnesium within the granule. Dolomite is a common mineral, and when calcined quickly in the processes of the embodiments described above, is produced as a high surface area, reactive material, which retains its structure when hydrated.

For use of semidolime material as a fertilizer, magnesium is released to the environment after hydration, following reaction of the hydroxyl ion with the acid. This is the same chemistry as that responsible for the production of cement. The reaction rate is dependent on the surface area, and this can be controlled by sintering to be as large as the calcined material, and as low as that of Periclase/Brucite. For use as either a dry sorbent, i.e. as semidolime material, or as a wet sorbent, i.e. as hydrated semidolime material, the same principles apply.

In application of the semidolime material, either dry, or as a hydrated granule, as a quick release fertilizer, the magnesium is available through hydration and hydroxide dissociation, with the kinetics driven generally by the neutralisation of hydroxyl ions in an acid environment. The semidolime material is otherwise insoluble, and does not act as a strong alkali, with deleterious effects. Therefore, the release is controlled by the environment. This contrasts with dolomite itself, which is also reasonably insoluble, and its rate of release is controlled by the carbonate consumption. This is a weaker effect, and as a result, the release kinetics is slow. In practice, the release of magnesium by dolomite as a fertilizer may take a year, but the release from semidolime material is complete within days, and the benefit to users is apparent. Also, semidolime material is not toxic.

The semidolime material, when maintained at a temperature about 50-150° C. lower than the calcination temperature of about 414° C., re-carbonates. This allows the semidolime material to be used in applications as a sorbent, e.g. in a process to capture carbon dioxide from the flue gases of the combustion process used to produce the heat, or from any other source. Thus a portion of the semidolime material produced by the superheated steam calciner can be used to capture the carbon dioxide from this flue gas stream in a carboniser reactor. The carbonised semidolime material is then cycled into a second calciner and the $CO_2$ released as described above, and is recycled until its reactivity is degraded by either sintering/phase separation or reaction with $SO_x$ from the fuel. The energy consumed in this process is associated primarily with the heating and cooling of materials, because the chemical energy required for calcination is largely recovered by carbonation. Thus, the remaining $CO_2$ emissions can be captured, and a zero emissions process for making the semidolime material can be achieved.

It will be appreciated by a person skilled in the art that the semidolime material, as a solid solution of magnesia and calcium carbonate, can substitute for a mixture of magnesia and calcium carbonate in many applications, whether produced by slow sintering of dolomite or by mixing these materials, to produce a range of cements and products made from cements. Those cements and products made from cements will have beneficial properties, principally strength, compared to these mixtures because the solid solution generates a preferred homogenous cementitious matrix.

Thus:—

The cement material can be fabricated wherein the hydration uses sea water, brine, or brackish water; and The cement material can be fabricated as above in which the setting rate is controlled by the addition of acids including such as sulphuric acid, uric acid, citric acid, lemon acid, glycolic acid, oxalic acid, and other di- or polycarboxylic acids, or other acidifying agents; and The cement materials can be made in which Pozzalans fillers such as fly ash, volcanic ash, alumina and aluminium salts are used as fillers; and The cement materials can be made in which organic waste materials such as silt, sawdust, wood shavings, shredded rubber, straw, rice husk, coconut fibre, wood chip, wood bark, paper, cardboard plastic and dried manure are used as fillers; and The cement materials can be made in which toxic or radioactive waste are used; and The cement materials can be made in which low density fillers such as expanded polystyrene bead, exfoliated vermiculite and exfoliated perlite are used; and The cement materials can be made in which inorganic fillers such as red mud, crushed rock, sand, gravel, alumina, coral, pumice, glass, cenospheres, concrete rubble, soil, lead concentrate, litharge, lead wood, boron, lithium, cadmium, lead acid batteries, metals dusts, gypsum, steel, glass fibre, carbon straw are used; and The cement materials can be made in which reinforcing fillers such as steel, glass fibre, carbon fibre, Kevlar, polypropylene rock woof, cotton and straw are used; and The cement materials of any of claims 4, 16-33 as mixtures thereof.

Further, the casting, pouring, molding, extruding, pressing, gunning of the cement materials described above, and the setting thereof can be used to produce building materials such as brick, paver, block, tile, mortar, pipe, board, panel, cladding, paving, structure, statue, monument, sleeper, post, pole, storage tank, boat, pile, wharf and marinas.

Turning now to the properties of semi-dolime as a sorbent, it can be appreciated by a person skilled in the art that the rapid calcination process produces a material that has a very high surface area, and particularly a surface that contains a very high proportion of mesopores (ie about 5-20 nm). This is because the very fast loss of weight of the particle induced by the superheated steam catalysis produces internal pressures from the escaping gasses that limit the reconstruction of the surface, or sintering, on the short timescale of the reaction that would otherwise anneal the pores. The pore dogging effect is further ameliorated because the $CaCO_3$ reduces the density of active magnesium sites on the micropore surfaces compared to MgO materials. The higher mass of the particles is the trade-off for such efficiency gain. It is a understood in the design of existing efficient sorbent systems to "dilute" the active sites on the surface in order to optimise the overall sorption, and semi-dolime accomplishes that for magnesium based sorption without any additional process steps. Thus semi-dame is manufactured as a "super sorbent" in a lower cost one step calcination process compared with super sorbents fabricated from calcining precipitated materials. The semi-dolime has the additional benefit of using the magnesium sites for sorption (ie low energy, low temperature) compared to calcium, and this is likely to outweigh the costs of using a material in which $CaCO_3$ acts as a support to the sorbent.

In the following, a process and system for fabrication of the semidolime material will be described with reference to FIGS. 1 to 7.

FIG. 1 shows a vertical calciner retort 10. The feedstock indicated at 12 is produced from rocks and ores that have been dried, crushed and pre-ground. The feedstock size distribution of between about 40 microns to about 125 microns is achieved by a conventional cyclone system 14 with a crusher and grinder 16. The feedstock 12 is preheated by exhaust gases in a heat exchanger 18 to obtain a temperature which is as close to the calcination temperature as possible without significant calcination taking place. The feedstock 12 is fed continuously into the retort 10 by a rotary feeder 20 through a throat 22 with baffles 24.

Superheated steam is injected at various points in the retort 10. In the described embodiment, there is one injector 26 at the top of the retort 10, adjacent the heat exchanger 18 and the throat 22. Another injector 28 is located at the base of the retort 10. The gases from inside the retort 10, comprising superheated steam and carbon dioxide are exhausted from the retort 10 through one or more ports located along the retort 10, and in this embodiment at or near the mid point of the retort 10, where an exhaust 30 is located in the described embodiment. The angle of injection of the superheated steam is such that the superheated steam does not cause a break up of the collective downwards flow of the granules, so as to minimise entrainment of granules in the exhaust. Preferably, for optimisation of the system the injection rate at each point is controlled. The thermal conductivity and the thickness of the walls 32 of the calciner retort 10 are such that the heat energy required for the calcination processes can be supplied by an external heat exchanger so as to achieve the desired conversion. In the example embodiment, the heat exchanger is in the form of a coiled heat exchange pipe system 34, with a heat exchange fluid inlet 36 located at the top 37 of the retort 10, and a heat exchange fluid outlet 38 located at the base 40 of the retort 10.

Figure 2:
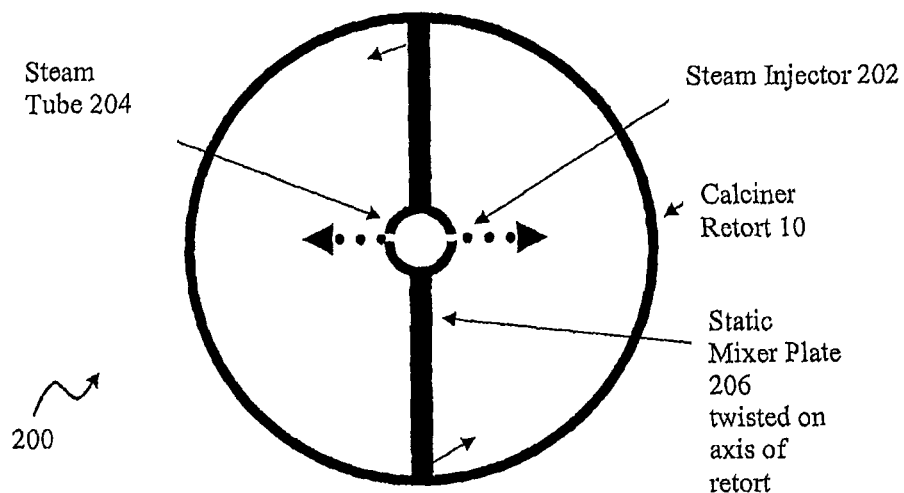
FIG. 2 shows a schematic horizontal cross-sectional view of a static mixer structure inside the retort of the calciners of FIG. 1, 3, 4 or 6.

A static mixture (not shown) is located inside the retort 10. Details of the static mixer in the example embodiment will now be described, with reference to FIG. 2. In FIG. 2, the static mixer 200 provides uniform turbulent mixing of the granules and the superheated steam, and maximises the interactions of the granules with the retort 10 surface. Superheated steam Injector openings 202 are incorporated within the static mixer 200 using a superheated steam tube 204 incorporated centrally in the static mixer 200. The static mixer 200 is fabricated from plate segments 206 having a width equal to the inner diameter of the retort 10 (FIG. 1). The plate segments 206 are twisted at a pitch angle of about 33.3°, and having a segment length equal to the pitch, or one half of the pitch. Each segment is attached to a segment of the opposite handedness, rotated by 90°. The assembly of such segments is inserted into the retort 10, and may be welded to it so that the surface area of the flange acts as a part of the heat exchanger system, or alternatively, joined in such a manner as to allow the segment to be vibrated so as to dislodge granules that would otherwise build up and constrict the granular flow. In the described embodiment, the assembly of the segments, i.e. the static mixer, extends from the base of the retort 10 to substantially underneath the throat 22 (FIG. 1). The superheated steam tube 204 is connected to the superheated steam injectors 26 and 28 (FIG. 1) through pipe elements (not shown). The superheated steam tube is centrally located in the retort with the superheated steam being injected at the throat or base of the retort.

In different embodiments, a mixer means may comprise non-mechanical means such as, but not limited to, superheated steam injected for mixing purposes into the retort chamber.

Returning now to FIG. 1, the parameters of the system, such as: the heat flow to the heat exchangers, the feedstock injection rates, the superheated steam injection rates at each injector, and the calciner gas pressure can be set by control of the parameters to achieve the desired conversion of calcined feedstock exiting at the base 40.

The superheated steam plays a number of roles:
Create the conditions of a gas-solid multiphase system.
Catalysing the reaction to enable the reaction process to be complete within the residence time of the feedstock granules.
Flushing carbon dioxide from the system so as to minimise the quenching of the reaction.
Rapid trimming of the retort processing condition by providing about ~1% of the energy needs of the reaction by adjustment of the flow rate and or injection temperature.
Inducing turbulent flow of the granules to enhance the collision rate of the granules and gas with the hot surface of the reactor walls and mixer walls, this being the principle mechanism for transferring the heat for the reaction to the granules.
Enabling the generation of pure carbon dioxide by its condensation and scrubbing.
Dislodging granules from surfaces so as to avoid the build up of granule plugs.

The feed rate of the feedstock 12 is chosen such that the volume fraction of solid material in the calciner at any time is a small fraction of the volume, about $5*10^{-5}$, and is sufficiently high such that the granules move downwards in a collective granular flow under the force of gravity, but is sufficiently small that the heat transfer is such that the desired degree of conversion can be achieved. The downwards collective flow must be stable against the drift of the gases upwards, while being buffeted by the turbulence in the gases, and deflected and mixed by the static mixer 200 (FIG. 2). This small volume fraction leads to a negligible force exerted on the retort 10 inner surface by the feedstock 12 granules, such that the surface exhibits negligible attrition.

The residence time of granules in the calciner is determined by the granular flow by gravity, taking into account the deflection of the granules by the static mixer 200 (FIG. 2) and the gas/granule separator (FIG. 5), and is the order of seconds in the described embodiment.

The superheated steam pressure is maintained at a slight positive gauge, so that there is minimal air entrainment and minimal superheated steam loss at the base 40 and the top 42 of the retort. The production of carbon dioxide accelerates the flow of gas from the retort 10 at the exhaust 30. There may be decrepitation of the granules in the retort 10 as the reaction proceeds, such that the product dropping from the base 40 may have a finer mesh size than the feedstock.

Further, the preheating of the feedstock by the heat exchanger 18 and the injection of a small fraction of the hot gases into the feeder 20 removes air entrained in the feedstock. Thus the exhaust gas comprises principally carbon dioxide and superheated steam. A condenser 42 removes the superheated steam from the gas, and also acts as a scrubber to remove entrained dust and noxious sulphur containing gases emitted from the feedstock. Alternatively, the dust is removed and bagged before the condenser. The residual gas is substantially pure carbon dioxide which can be compressed and stored for use, including carbon capture processes such as sequestration.

The temperature of the calciner walls is maintained at the desired calcination temperature by heating the outer wall 32 of the retort 10. In the dual segment design, the temperatures for each segment may be different and each segment may operate with a temperature gradient along the walls 32. There are many means of achieving the external heating. In the described embodiment, the source of a heat is by a heat conducting heat exchange fluid provided at a temperature above the calcination temperature so that the temperature difference provides the necessary heat flow to the retort 10. In the described embodiment, the heat exchange pipe 34 is coiled around the retort 10 in a helix and affixed (e.g. by welding) to the retort 10 for efficient conduction. The pitch of the helix is set so that the entire outer surface of the retort 10 can be maintained at the calcination temperature through a balance of the heat conduction along and around the retort walls 32, the heat load caused by the reaction and the heat transport of the falling feedstock granules and the rising turbulent gases. As mentioned above, it will be appreciated that different means for heating of the retort 10 can be provided in different embodiments, including, but not limited to, using an open flame heating system around the retort 10.

In the described embodiment the superheated steam flow rates and the temperature of the superheated steam in each segment, and the superheated steam pressure, can be used to trim the performance of the calciner to provide the desired degree of conversion.

With respect to energy management, the described calciner is a recuperative design in which the heat contained in the gases at the top of the retort 10 and the heat extracted from the calcined feedstock is used to heat the feedstock, dry the rocks and heat the water for the boilers etc. The management of heat in such systems is understood in the art to achieve the maximum efficiency. The described design uses a granular flow cooling segment (not shown) at the base 40 so that the granules are delivered at the base 40 at a low temperature. An example of a suitable cooling segment will be described below with reference to FIG. 7. The heating of the feedstock by the exhaust gases is practiced in existing calciners, while the desirable operating conditions of the condenser and the compressor, the means of drying, crushing and grinding the rocks to feedstock, and operation of the superheater for maximum efficiency are understood industrial processes, that, when practiced, enables the described calciner to operate at a high thermal efficiency.

The calciner retort 10 is surrounded by a thermal insulation, in the described embodiment comprising an air gap 44 next to the calciner retort 10 and an outer layer of solid thermal insulation 46. The thickness of the solid thermal insulation 46 and its efficiency is chosen such that the loss of heat to air is minimised. The calciner retort 10 can also be vibrated or rotated so as to eliminate the build-up of granules on surfaces, utilising understood mechanisms provided by a vibration or rotation unit 48 coupled to the calciner retort 10.

The inventors have recognised that while the theoretical parameters for the thermodynamic and kinetic properties for the calcination and superheated steam calcination of dolomite are not sufficiently well established, the operation of the catalytic superheated steam calciner for production of semidolime can be understood from the theory of the calcination of lime.

Khinast et al, Chem Eng Sci, 51, 623-634 (1996), studied the calcination reaction for limestone particles of diameter d<100 micron at 1053° C., without superheated steam. They found that the irreversible reaction rate for a surface area of $S(x)$ depends on $CO_2$ partial pressure p (with total pressure of 1 atm) was modelled by the equation:

$$k_A(x) = 2.02 \times 10^{-7} S(x) \exp(-11.92 \times p/po) \ s^{-1}$$

where $p_o$ is the equilibrium carbon dioxide pressure determined from the known equilibrium constant $K_p = (1-x)/x \ p/p_o$ where x is the degree of conversion of the feedstock. The particle surface area $S(x)$ evolves during the reaction, and Khinast et al demonstrated that their results could be modelled by a random pore distribution that evolves as:

$$S(x) = S_o (1-x)^{1.7} (1-37 \ln(1-x))^{0.69} \ m^2/kmol$$

where $S_O$ is the BET surface area in $m^2/kmol$. For limestone, $S_O$ is ~$2.10^5 \ m^2/kmol$. The reaction time, $k_A(0)^{-1}$, without superheated steam catalysis, is 50 sec at 1053° C. with p=0 (ie the quenching being suppressed by a low carbon dioxide concentration), whereas the residence time in a conventional kiln is many hours.

The inventors have recognised that the experimental reaction time is applicable in the situation in which the residence time in a calciner is sufficiently short. This means that the back-reaction, namely the re-incorporation of carbon dioxide into the particles, does not take place or is minimised. The described process has been developed in light of this recognition by the inventors.

The exponential reduction of the forward reaction rate with p demonstrates that the forward rate is rapidly quenched by carbon dioxide. The chemical process for calcination will generally follow an Arrhenius form given by:

$$k_A(x,T) = k_o(x) \exp(-E_A/RT) \ s^{-1}$$

where $E_A$ is the activation energy and R is the gas constant. For lime, the activation energy $E_A$ was determined by Wang and Thompson, Chem Eng Sci, 50, 1373-1382 (1995) to be 197 kJ mol$^{-1}$ and by Beruto and Searcy, J. Chem. Soc. Faraday Trans 70, 2145-2153 (1974) to be 205 kJ mol$^{-1}$. These compare with the enthalpy of reaction of 168 kJ mol$^{-1}$.

The presence of superheated steam as a catalyst provides an alternative pathway for the reaction. Wang and Thompson used very small particles (~1μ) of limestone, so that the impact of the mass transport processes was minimised. They considered partial pressures of superheated steam <0.2 atm, and carbon dioxide at <0.0008 atm, and studied the process in the range from 440° C. to 560° C. They experimentally showed that the catalytic effect of the superheated steam arises from the adsorption of water molecules on the surface as the first step, which induced a weakening of the bonding of the carbon dioxide to the calcium by the adsorbed water molecules as the second step. The adsorption of water followed the equilibrium constant $K_{ads}$ with a binding energy $\Delta H_{ads}$ of 1.5 kJ mol$^{-1}$. They observed that the reaction rate is increased significantly as the partial pressure of superheated steam is increased, and they modelled this behaviour using the Langmuir-Hinshelwood model of surface catalysis, with $$k_{catalysis}=k_A+(k_B-k_A)K_{ads}p_x/(1+K_{ads}p_x)$$

where $p_x$ is the partial pressure of superheated steam. At low superheated steam pressures, the uncatalysed reaction rate $k_A$ dominates, whereas at sufficiently high superheated steam pressures where $K_{ads}p_x \gg 1$ the catalysed reaction rate $k_B$ dominates. Wang and Thompson measured for lime an activation energy $E_B$ for the rate constant $k_B$ to be 247 kJ mol$^{-1}$, and showed that the catalytic effect becomes relatively more pronounced at higher temperatures (ie $k_B/k_A$ increases with temperature), but the effect is partially reduced at constant superheated steam partial pressure because the binding of the water to the particles is reduced as the temperature increases. They extrapolated their results to higher temperature, and showed that the ratio $k_B/k_A$ increases from 2.0 at 670° C. to 14 at 860° C. The catalysis pathway has higher activation energy than the uncatalysed pathway, but a much smaller activation entropy, which means a simpler reaction path.

The inventors have recognised that, based on the experimental findings in the respective works mentioned above, based on the similarity of the calcination of limestone and dolomite, that the reaction rate can be reduced to seconds when calcining granules in the presence of superheated steam at temperatures appropriate to calcination The described process has been developed in light of this recognition by the inventors.

The principles for the described calciner properties can be adequately described by treating the calciner as a uniform reactor in which the heat and mass transfers as described above give an average calcination temperature $T_c$ as the result of the turbulence and the rapid transfer of heat to the feedstock particles. A more precise approximation is to consider the calciner in segments to deal, for example with the need for a higher rate of heat to be supplied at the top of the retort 10 than at the base 40, and to evaluate the calcination temperature at each point $T_c(z)$. It will be appreciated that the expressions given below are adequate provided it is understood that $T_c(z)$ is a nominal average value.

In this approximation, the quantities below are averaged over the calciner. The mass and energy balances for the calciner of FIG. 1 is given by the heat flow dQ/dt $$dQ/dt=UA(T_e-T_c)-\gamma_A\alpha\Delta H_{calc}(T_c)+\gamma_A C_{p,reactant}(T_{in}-T_c)+\gamma_{steam}C_{p,steam}(T_s-T_c)$$

In this expression U is the heat transfer coefficient from the external heat exchanger at its (average) temperature $T_e$ to the feedstock particles at the (average) calcination temperature $T_c$, through the calciner surface area A. The injection temperatures of the reactants and superheated steam can be set equal to $T_e$. U is given by the expression $$U=1/(1/h_e+\delta r/k+1/h_c)$$

where $h_s$ is the heat transfer coefficient from the external heat exchanger 34 to the outer calciner wall 32, δr is the wall 32 thickness and k is the heat conductivity of the wall 34 material, and $h_c$ is the heat transfer coefficient from the inner wall 32 to the particles. The coefficient $h_c$ is of particular importance for the process, and is considered below.

In the heat flow equation, the second term contains the heat consumed by the reaction at temperature Tc where $\gamma_A$ is the feedstock rate in kg s$^{-1}$ and α* is the extent of the reaction for the calcination of the magnesium site of dolomite given by $$\alpha^*=1-\exp(-<k_{reaction}(T_c)>^*\tau_{res})$$

where $<k_{reaction}(T_c)>$ is the nominal average rate of reaction, and $\tau_{res}$ is the residence time of reactants in the calciner, and $\Delta H_{calc}$ is the enthalpy of reaction in J/kg. The third term is the heat change of the reactants which enter calciner at temperature $T_{in}$, and are mixed to the reaction temperature $T_c$. The fourth term is the heat change of the superheated steam which is injected at a rate of $\gamma_{steam}$ at temperature $T_s$ and exits at the temperature $T_c$.

The average calciner temperature at steady state, $T_c$, is the temperature at which dQ/dt=0.

While this approximate model is useful for teaching the principles of the described calciner, it does not take into account some important properties of the described embodiment. Firstly, the temperature in the calciner $T_c(z)$ varies strongly along the calciner vertical axis in response to the limited heat transfer rate through the calciner walls. Secondly, the gas pressure in the calciner is maintained at the average superheated steam pressure $p_s$ by regulating the flow of gasses from the exhaust 30. The carbon dioxide produced in the reaction increases the flow rate of the mixed gases through the calciner to retain this total pressure, but the partial pressure varies along the retort 10. Thus at the throat 22 and the base 40, the gas is largely superheated steam at pressure $p_s$, while at the exhaust 30 the gas is a mixture of superheated steam, also at pressure $p_s$, and the released carbon dioxide. This affects the quenching of the reaction, and thus the yield.

If the smaller contributions arising from the temperature differentials of the feedstock and the superheated steam are neglected, the calciner operating condition is given by $$UA(T_e-T_c)=\gamma\alpha^*\Delta H_{calc}(T_c)$$

For the complete calcination of the magnesium site, $$<k_{reaction}(T_c)>^*\tau_{res}\gg 1, \text{ so that } \alpha\approx 1,$$

This approximation essentially sets the parameters of the design of the heat exchange between the heat exchange fluid and the feedstock particles. The heat transfer is considered for a 12 m high calciner constructed of 0.36 cm thick stainless steel with a diameter of 0.32 m for calcining dolomite with feedstock rates at 1.8 kg s$^{-1}$, without the use of the static mixer. This requires 1.1 MW of heat for the reaction to be provided to the surface area of 12.1 m$^2$. In considering the three contributions to U, it is understood that the heat transfer from the walls 32 of the retort 10 to the granules is very efficient. This arises from the high viscosity of the granular flow, which can be estimated to be about 1 Pa s, and this generates a friction at the calciner walls. More exact estimates can be made from the Kinetic Theory of Granules. This high friction at the boundary causes efficient heat flow, which significantly exceeds that of the heat transfer through the walls of the calciner, ie $h_0 \gg k/\delta r$. The heat exchanger is designed such that $h_e \gg k/\delta r$, so that $U \approx k/\delta r = 5970\,\mathrm{Wm^{-2}K^{-1}}$. That is, the heat transfer is controlled by the ability to transfer heat through the walls 32 of the calciner. Stainless steel, acknowledged as an average thermal conductor, can provide this heat flow with a temperature difference of about 25° C. through a retort wall 32 of a thickness of 0.33 cm.

The static mixer 200 (FIG. 2) is used, in part, to increase the surface area for heat transfer, but the principle tasks of the static mixer 200 (FIG. 2) are to deflect kinetic energy into the $(r,\theta)$ plane to induce the granular flow, and to mix the granule flow streams to break up the tendency for the granules to form a laminar flow, so that the degree of calcination is uniform across the calciner by virtue of this mixing. It is understood that the static mixer 200 (FIG. 2) can, for example, be constructed from helical segments to achieve those tasks, as described above.

Figure 3:
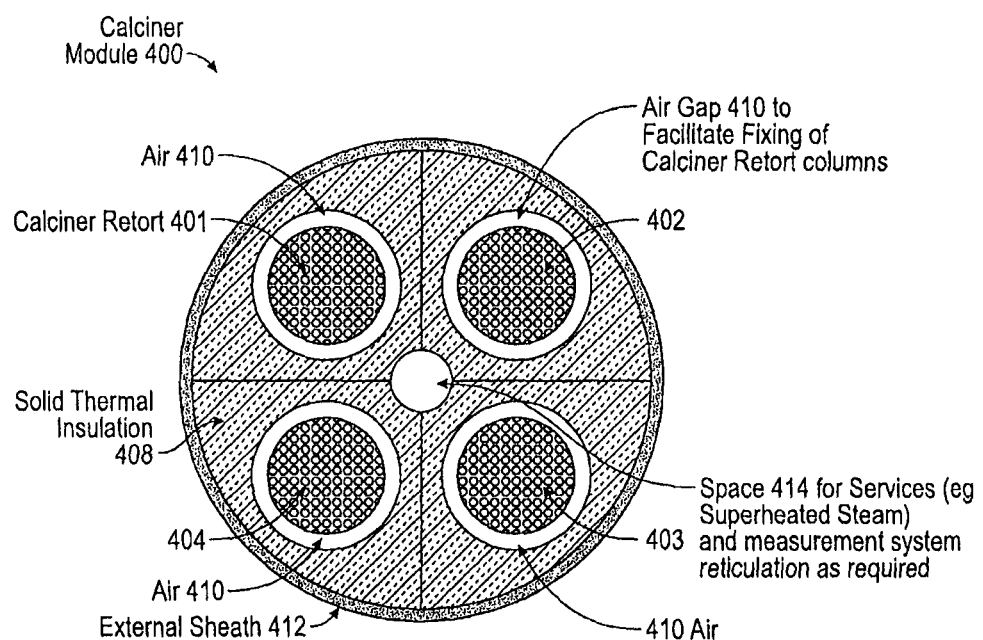
FIG. 3 shows a schematic horizontal cross-sectional drawing of a 4-throat calciner module for production of the semidolime material according to an example embodiment.
Figure 4:
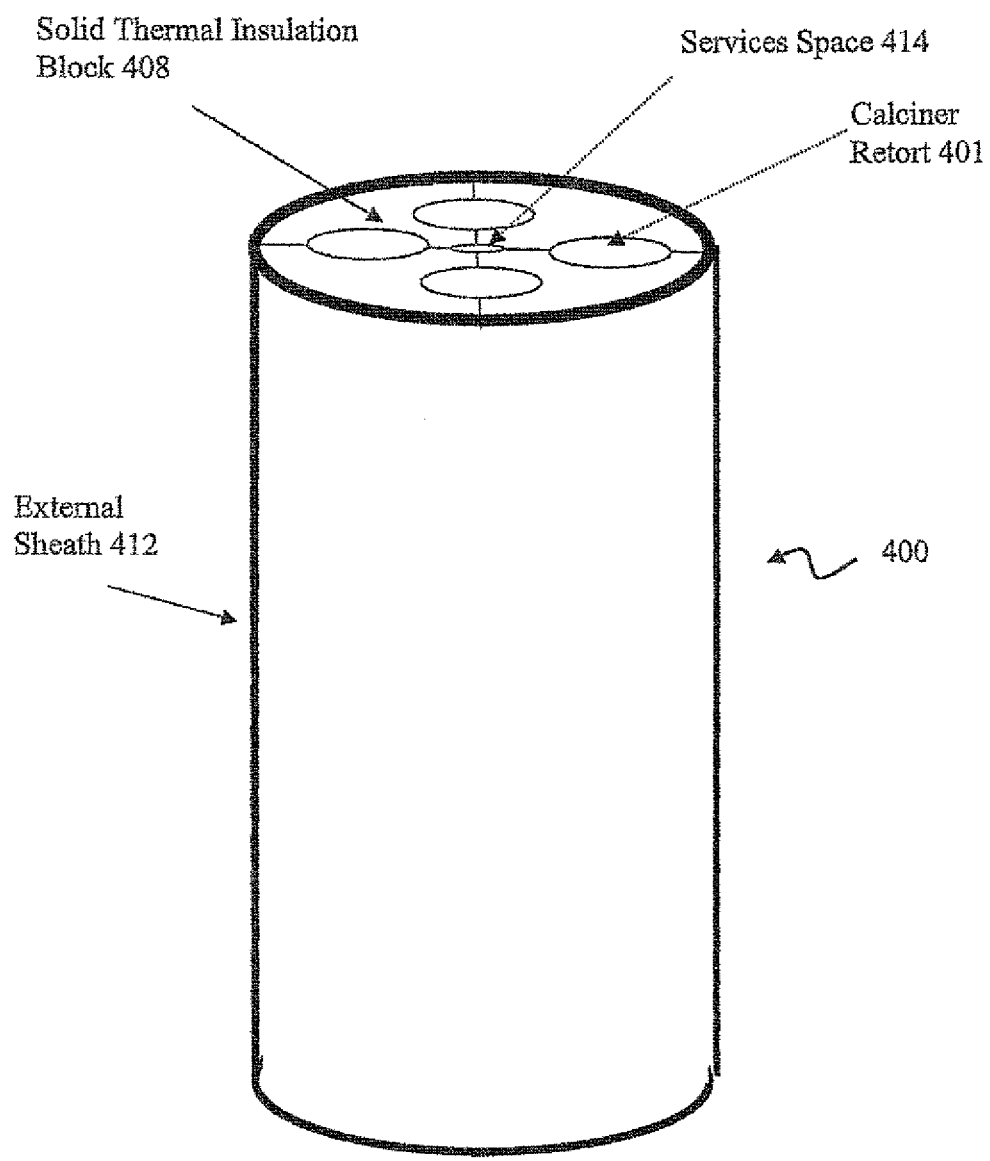
FIG. 4 is a schematic perspective view of the calciner module of FIG. 3.

FIGS. 3 and 4 show a 4-throat calciner module 400 with a capacity of 12-16 tonnes/hr, such that a calciner system for a higher capacity would use a number M of such modules to give a throughput of 12M-16M tonnes/hr. It is the description of the 4-throat calciner module that embodies the features of the scaling, because a 4M-calciner system is formed by replicating the 4-throat calciner module M times. The scale advantages of such a module are derived from factors such as heating efficiencies of the circulated heat exchange fluid, the boiler efficiencies for production of superheated steam, heat exchanger efficiencies and the like, which are understood in the art. The selection of a module having 4 throats is illustrative only, and the invention is not limited by this choice.

The 4-throat calciner module 400 is shown in a horizontal cross-section in FIG. 3, and in a perspective view in FIG. 4. The four retorts 401-404 are symmetrically placed and separated preferably to allow independent temperature control in each calciner. The temperatures of each retort can be controlled, for example, by the flow rate of the heat exchange fluid to each retort from a single source of heat supplied to the module 400. FIG. 3 shows the solid thermal insulation supplied in four segments, e.g. 408. An air gap 410 is left between the insulation e.g. 408 to give the convenience in the insertion and replacement of each retort cylinder 401-404 into the module 400. The assembly of the module 400 will be further considered below. The outer part of the module 400 is a steel sheath 412 to provide protection from the environment and support. A central space 414 is provided for services, such as the cabling for the measurement and control systems, and pipes (not shown) for the superheated steam and the heat exchange fluid.

Each retort throat has an individual rotary feeder (not shown). The heat exchange fluid can be switched to each feedstock pre-heater when the standby mode is activated, to keep the feedstock at the temperature poised for processing to commence almost instantaneously. There are a number of additional advantages of having independent control of each retort 401-404, including that any number of retorts can be operational, so that if the demand for product is low or production is otherwise constrained, the module 400 can operate at increments of 1-4 times the capacity of a single retort, without any resetting of the calciner retort operating conditions of those throats in operation, while the other throats can be held on standby or turned off. The module 400 is controlled by using measurements of the temperatures at various regions and points, the flows of the feedstock, the heat exchange fluid and superheated steam, and the physical properties of the feedstock and calcined product, and adjusting these as required.

Figure 5:
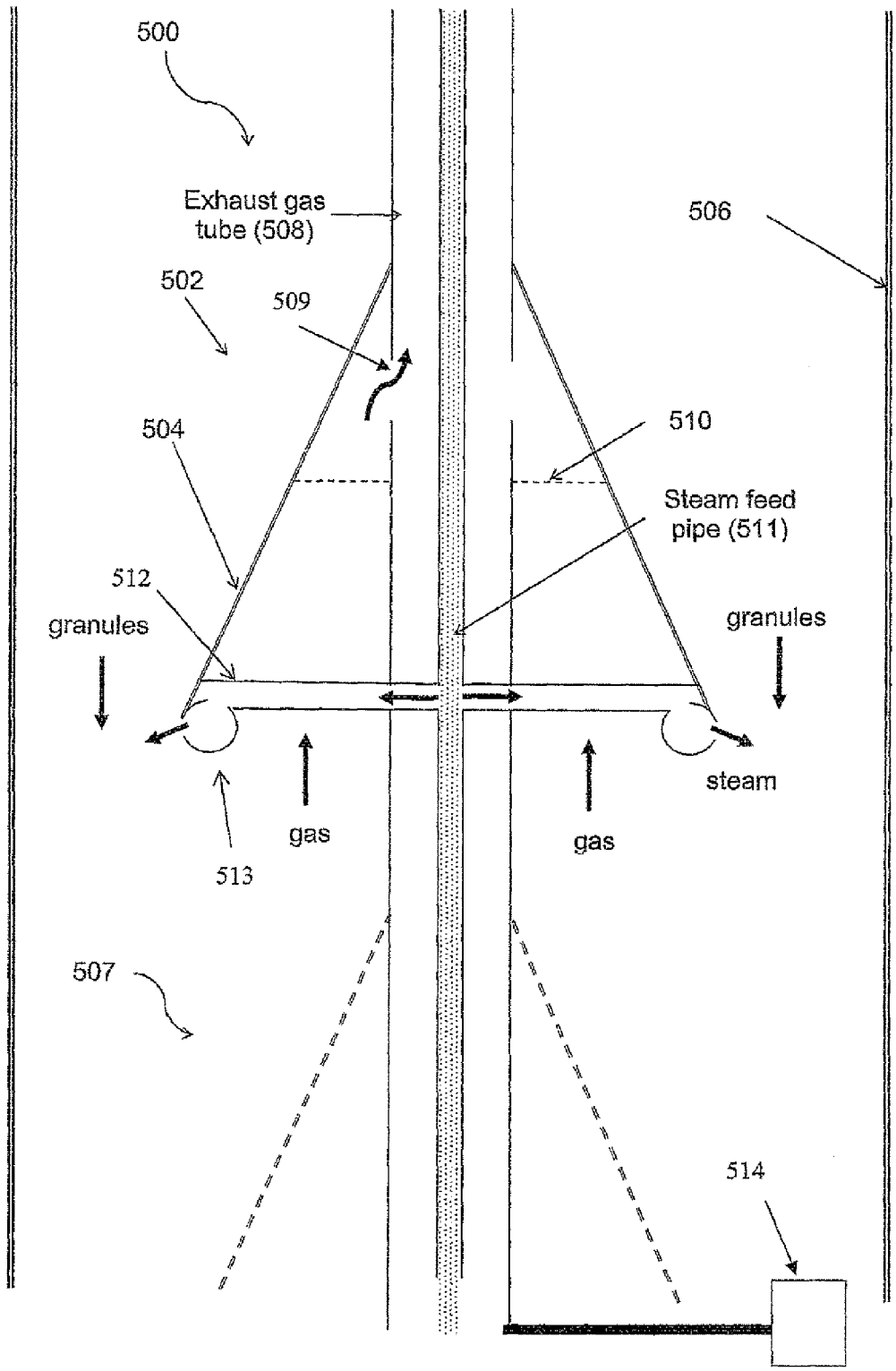
FIG. 5 shows a schematic horizontal cross-sectional view of a gas/particle separator structure inside the retort of the calciners of FIG. 1, 3, 4 or 6.

FIG. 5 shows a schematic vertical cross-sectional drawing of an internal structure for use in the calcination retorts of the embodiments described above with reference to FIGS. 1 to 4. The structure 500 consists of a number of conical segments that can be used to separate the carbon dioxide from the granules in each segment, so that built up of carbon dioxide along the calciner report is reduced.

Each conical segment e.g. 502 is placed so that granules falling onto the exterior of the cone 504 are deflected to the calciner walls 506, and the solids density is increased as the granules flow down towards the base of the cone 504. The gases from the segment 507 below are exhausted by their upwards flow into the inner region of the segment 504 and are injected into an exhaust tube 508 through openings e.g. 509. Superheated steam is injected from a feed pipe 511, the feed pipe 511 being disposed inside the exhaust tube 508, near the base of each cone e.g. 504 via pipe conduits 512 to a slotted ring 513 with the slot formed so as to limit the flow of gases from the segment 506 below, to saturate the granules with superheated steam to facilitate catalytic action in the segment 506 below, and by flowing upwards, to regulate the gas pressure in the segment 502 so that the gas/granule separation is effective. The feed rate and angle of injection is such that the break-up of the collective downwards flow is preferably perturbed only to the extent that granules do not disengage from the flow to get entrained as dust in the exhaust. To further minimise this effect, a screen e.g. 510 can be placed near the exhaust point of the gas and is electrically charged from an external battery (not shown) so as to repel such disengaged granules, based on the fact that ground granules have a significant surface charge. That is, the separator 500 is designed to minimise granule entrainment in the exhaust. The separator can also be vibrated or rotated so as to eliminate the build-up of granules on surfaces, utilising understood mechanisms provided by a vibration or rotation unit 514, coupled to the separator 500. The exhaust tube 508 and the feed pipe 511 are coupled to one or more exhaust openings and one or more superheated steam inlets of the retort chamber respectively, using pipe connections. This separator structure 500 may be combined with a helical static mixer (compare FIG. 2) by alternating respective segments, so that the helical static mixer causes azimuthal and radial mixing of the granules (to achieve uniform conversion), while the cone section promotes efficient interaction with the calciner walls. Alternatively, the helical static mixer may be incorporated onto the outside of the conical structure 500.

Figure 6:
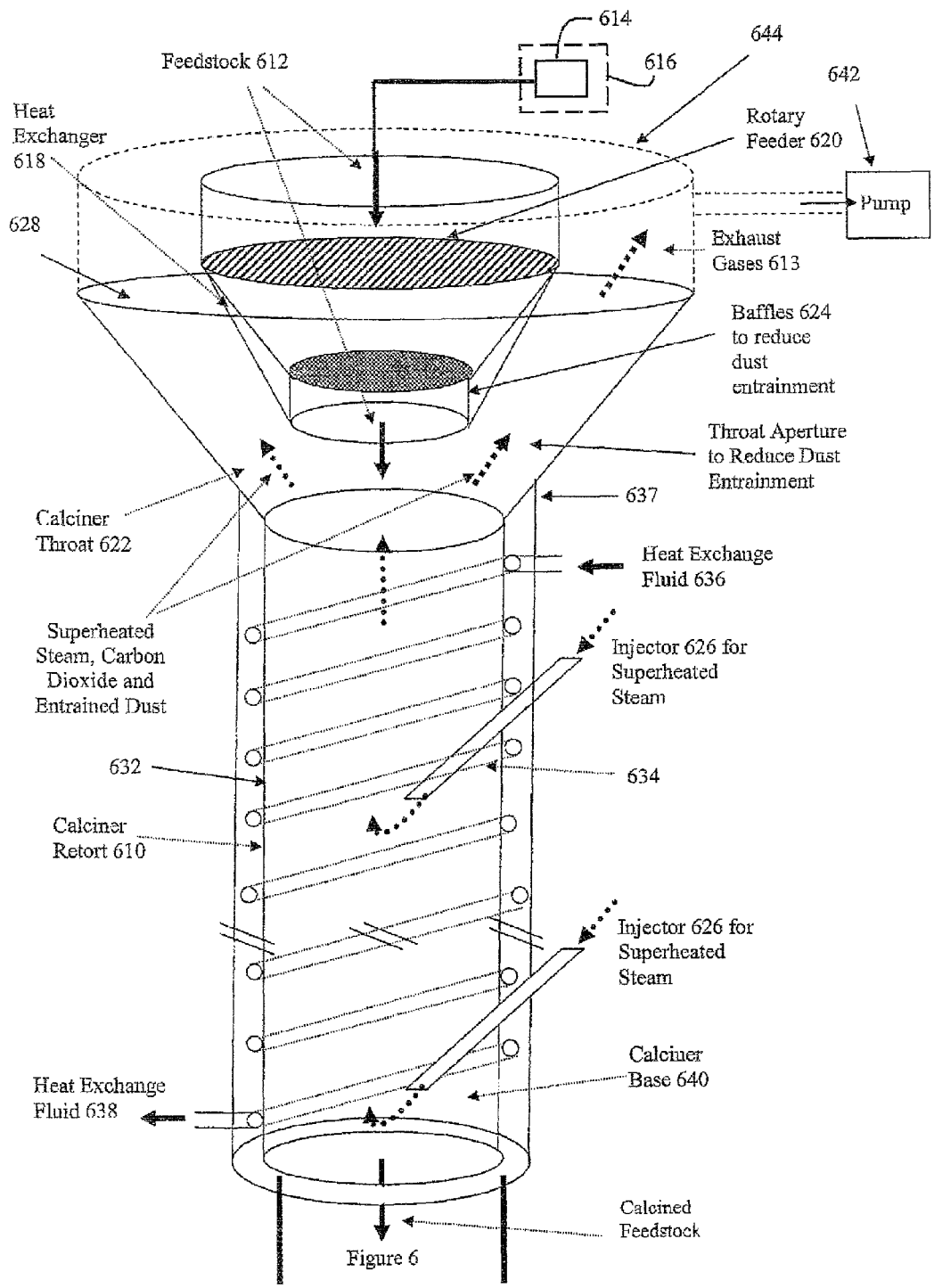
FIG. 6 shows a schematic vertical cross-sectional view of a calciner for production of the semidolime material according to an example embodiment.

FIG. 6 shows a vertical counter flow reactor calciner retort 610 according to another embodiment. The feedstock indicated at 612 is produced from rocks and ores that have been dried, crushed and pre-ground. The feedstock size distribution of between about 40 microns to 125 microns is achieved by a conventional cyclone system 614 with a crusher and grinder 616. The feedstock 612 is preheated by exhaust gases 613 from the retort 610 in a heat exchanger 618 to obtain a temperature which is as close to the calcination temperature as possible. The feedstock 612 is fed continuously into the retort 610 by a rotary feeder 620 through a throat 622 with baffles 624.

Superheated steam is injected in the retort 610 at a plurality of injectors 626. The gases from inside the retort 610, comprising superheated steam and carbon dioxide are exhausted from the retort 610 through the top opening 628 around the heat exchanger 618. The thermal conductivity and the thickness of the walls 632 of the calciner retort 610 are such that the heat energy required for the calcination processes can be supplied by an external heat exchanger so as to achieve the desired conversion. In this embodiment, the heat exchanger is in the form of a coiled heat exchange pipe system 634, with a heat exchange fluid inlet 636 located at the top 637 of the retort 610, and a heat exchange fluid outlet 638 located at the base 640 of the retort 610.

A static mixer of the type of static mixer 200 described above with reference to FIG. 2 is used on the inside of the retort 610. In an alternative embodiment, an internal structure consisting of alternating mixer segments as described above with reference to FIG. 2, and gas/granule separator segments of the type described above with reference to FIG. 5 are implemented on the inside of the retort 610. In yet another embodiment, gas/granule separator segments incorporating a mixer structure on a surface of the respective separator elements may be implemented on the inside of the retort 610. In yet another embodiment, the gases in the retort are mechanically pumped from the retort utilising a pump 642 coupled to a hood structure 644 above the exhaust opening 628 so as to reduce the impact of the back reaction by reducing the partial pressure of product gases.

Figure 7:
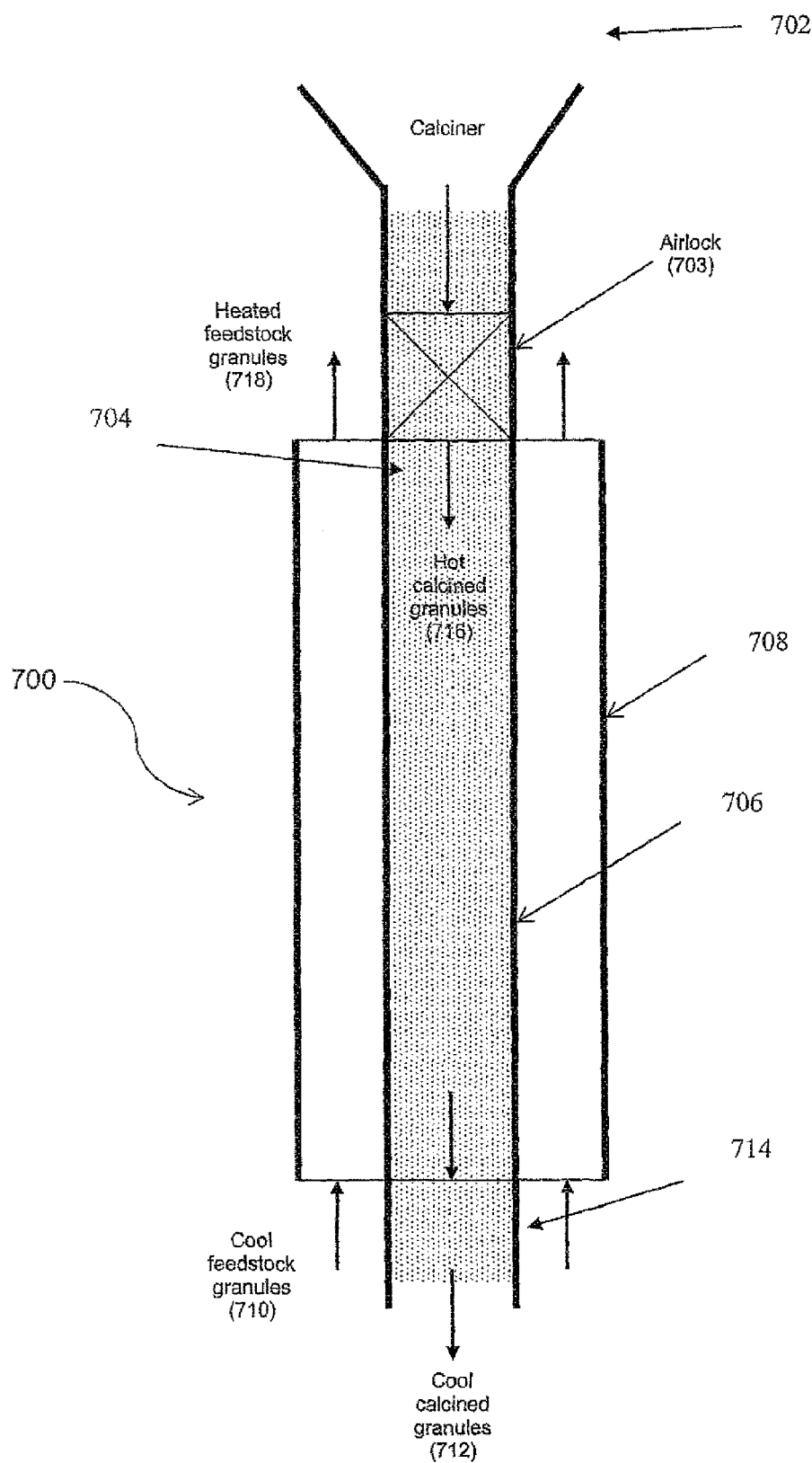
FIG. 7 shows a schematic drawing of a cooling segment in the form of a heat exchanger for use in the calciners of FIG. 1, 3, 4 or 6.

FIG. 7 shows a schematic drawing of a cooling segment in the form of a heat exchanger 700 for use in the described calciners. The heat exchanger 700 is based on the efficient heat transfer that arises from granular flows, as described above. In the heat exchanger 700, the hot calcined granules from the base of the calciner 702 are injected at a temperature $T_{calcined}$ through an air lock 703 into a Downer Section 704 in which heat is transferred across the walls 706 of the heat exchanger 700 to a riser section 708 into which feedstock granules 710 are injected at a temperature $T_0$ by a blower system (not show). The efficient heat transfer from the granular flows in the granules to the heat exchanger walls 706 is such that cooled calcined granules 712 are ejected from the base 714 of the heat exchanger 700. Since the feedstock and particle flow rates are the same for continuous processes, and the heat capacity $C_{v,calcined}$ of the hot calcined granules 716 is less than the heat capacity $C_{v,feedstock}$ of the feedstock granules 710, then the efficiency of the heat transfer can be very high. For a sufficiently long heat exchanger, the temperature of the heated feedstock granules 716 $T_{feedstock}$ exiting the heat exchanger is limited by the ratio of heat capacities. Thus $$[T_{feedstock} - T_0]C_{v,feedstock} = C_{v,calcined}[T_{calcined} - T_0]$$

In an example embodiment, the design is not to heat the feedstock particles 718 too high that calcination takes place, and principally to cool the calcined granules 712 rapidly so that phase separation is quenchend, which also leads to a cooling so that the granules can be handled easily. In the described design, the cooling preferably occurs on a time scale comparable to the residence time of the granules in the retort chamber, i.e. of the order of seconds. The footprint of the module 700 is small, thereby retaining the competitive advantage of the described calciner systems relating to small footprint. The heat transfer efficiency from the surface of the wall 706 to the granules is faster than the heat transfer through the walls 706 to the granules. The carrier gases used in the module 700 can be air.

The calcining temperature for processing of dolomite in the calciner examples described above with reference to FIGS. 1 to 7 and using the process described herein is between about 450-650° C. in 1 atm of superheated steam, which is about 50-150° C. above the equilibrium temperature of about 414° C. for a partial pressure of carbon dioxide at 1 atm. The feedstock comprises granules of a size distribution of between about 40 microns to about 125 microns. It is understood that the composition of minerals varies depending not only on the area of a site being mined, but also in different geologic regions. To consider the dependence of the superheated steam catalysis on such different samples, a test calciner was constructed for batch processing. In this case, the back reaction is greatly suppressed, and the superheated steam pressure is uniform within the calciner. The test calciner was 24 m high, and was operated in five segments with independent control of the temperature. Batches of granules between about 0.2 to 2 kg were weighed and then calcined in a single pass. After each pass, the calciner was cleaned by passing through metal shot, and the mass loss of the granules was measured to determine the degree of conversion. The samples were pre-heated to remove moisture. The results are illustrated in Table 1 below for the calcination of a magnasitic dolomite sourced from Korea which was assayed to be 71% $MgCO_3$ and 28% $CaCO_3$ by weight. The rocks were ground to give a range of particle sizes. Charges of about 500 gm were used in superheated steam of about 1 atm, so that the available carbon dioxide was about 185 gm. Runs 1-3 used granules passed through a 240 micron mesh to remove the larger particles, runs 4-10 with a 150 micron mesh and runs 11-14 with a 200 micron mesh. The average particle size was about 125 microns. The charges were processed with about 1 atm superheated steam. From the measured weight loss, the conversion of the magnesium site was calculated as shown in the table below. Table 1 illustrates that a high degree of conversion of the magnesium sites can be obtained, and Table 1 further illustrates the degree of control of the temperature along the calciner to maintain a desired conversion. Under these conditions, there was no conversion of the calcium site, as demonstrated by tests using pure lime with no conversion and with pure magnesite that gave similar conversions as those above.

TABLE 1

| | | | | | | | Results | |
|---|---|---|---|---|---|---|---|---|
| | Steam | Retort Segment Temperatures | | | | | % | % |
| Run | Temp | 1 | 2 | 3 | 4 | Av | Loss | Conversion |
| 1 | 493 | 531 | 544 | 545 | 549 | 542 | 12% | 32% |
| 2 | 493 | 529 | 541 | 541 | 543 | 539 | 23% | 63% |
| 3 | 494 | 527 | 538 | 537 | 536 | 535 | 35% | 95% |
| 4 | 400 | 417 | 418 | 410 | 402 | 412 | 5% | 13% |
| 5 | 415 | 439 | 439 | 431 | 421 | 433 | 13% | 34% |
| 6 | 424 | 437 | 437 | 438 | 449 | 440 | 22% | 58% |
| 7 | 425 | 406 | 406 | 400 | 407 | 405 | 28% | 75% |
| 8 | 474 | 541 | 561 | 568 | 578 | 562 | 5% | 10% |
| 9 | 472 | 541 | 561 | 578 | 601 | 570 | 13% | 25% |
| 10 | 476 | 512 | 527 | 538 | 545 | 531 | 13% | 27% |
| 11 | 0 | 557 | 595 | 521 | 583 | 564 | 0% | 0% |
| 12 | 0 | 552 | 559 | 505 | 562 | 545 | 0% | 0% |
| 13 | 457 | 376 | 598 | 599 | 643 | 554 | 15% | 40% |
| 14 | 456 | 568 | 587 | 605 | 659 | 605 | 28% | 76% |

The absence of contamination of the material with sintered MgO was determined from the hydration properties of the material, through the absence of the slow hydration component characteristic of sintered MgO. It is the absence of this contamination which is important for the applications of the material as described herein.

Figure 8:
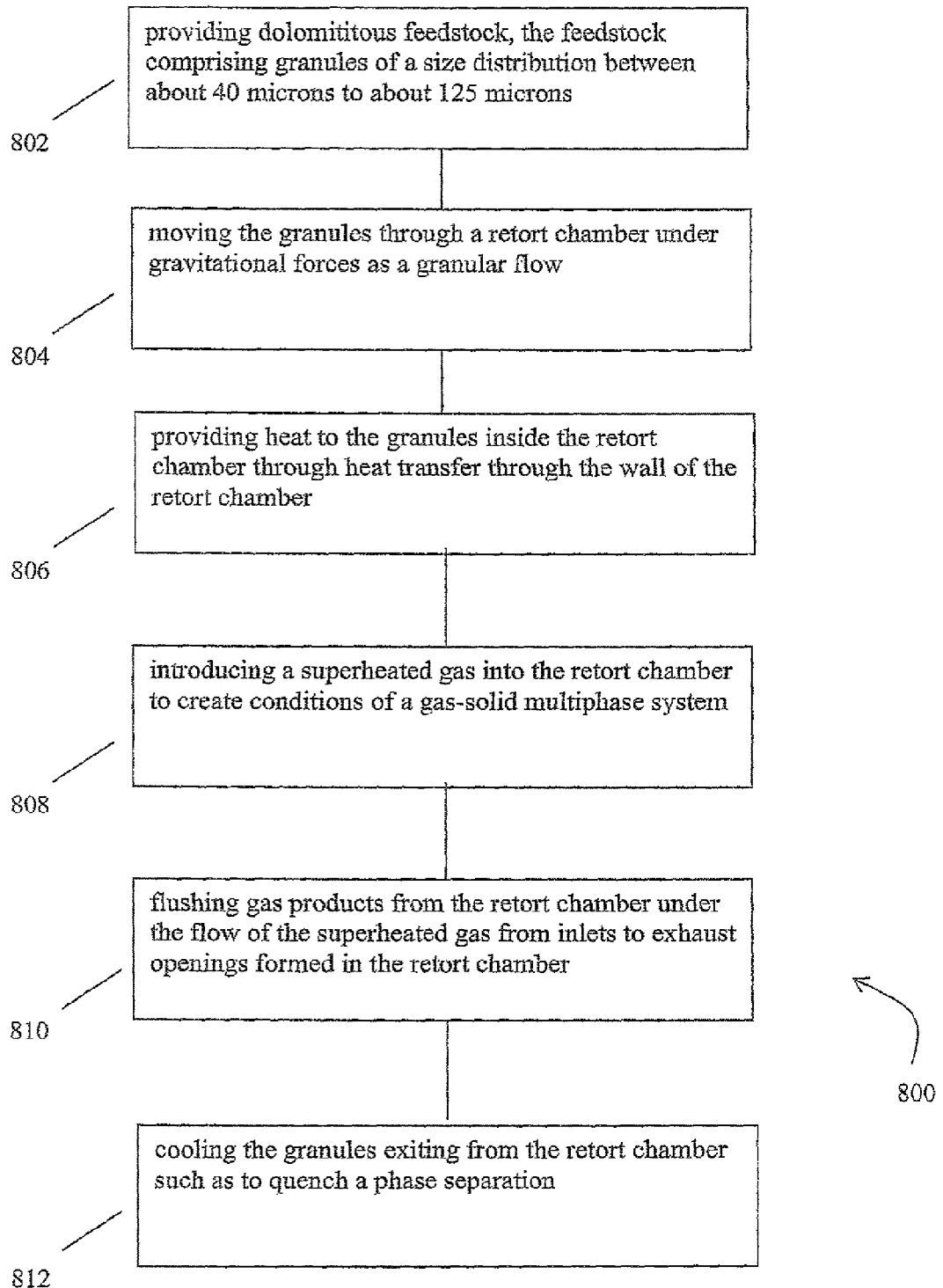
FIG. 8 shows a flowchart illustrating a method of fabricating a material compound, $MgO \cdot CaCO_3$ as a solid solution of MgO and $CaCO_3$.

FIG. 8 shows a flowchart 800 illustrating a method of fabricating a material compound, $MgO \cdot CaCO_3$ as a solid solution of MgO and $CaCO_3$. At step 8002, a feedstock is provided, the feedstock comprising granules of a size distribution between about 40 microns to about 125 microns. At step 804, the granules are moved through a retort chamber under gravitational forces as a granular flow. At step 806, heat is provided to the granules inside the retort chamber through heat transfer through the wall of the retort chamber. At step 808, superheated steam is introduced into the retort chamber to create conditions of a gas-solid multiphase system. At step 810, gas products are flushed from the retort chamber under the flow of the superheated steam from one or more inlets to one or more exhaust openings formed in the retort chamber. At step 812, the granules exiting the retort chamber are cooled such as to quench phase separation.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A material compound consisting of a single phase of $Mg(OH)_2 \cdot CaCO_3$, as a solid solution of $Mg(OH)_2$ and $CaCO_3$.

2. A cementatious reactant of a cement comprising a single phase of $Mg(OH)_2 \cdot CaCO_3$ as a solid solution of $Mg(OH)_2$ and $CaCO_3$.

3. A fertilizer comprising a single phase of $Mg(OH)_2 \cdot CaCO_3$ as a solid solution of $Mg(OH)_2$ and $CaCO_3$.

4. A sorbent comprising a single phase of $Mg(OH)_2 \cdot CaCO_3$ as a solid solution of $Mg(OH)_2$ and $CaCO_3$.

5. A method of fabricating a material compound consisting of a single phase $Mg(OH)_2 \cdot CaCO_3$ as a solid solution of $Mg(OH)_2$ and $CaCO_3$, the method comprising the steps of:
providing a feedstock, the feedstock comprising granules of a size of about 40-125 microns;
moving the granules through a retort chamber under gravitational forces as a granular flow;
providing heat to the granules inside the retort chamber through heat transfer through the wall of the retort chamber;
introducing superheated steam into the retort chamber to create conditions of a gas-solid multiphase system; and
flushing carbon dioxide produced during the calcination reaction from the retort chamber under the flow of the superheated steam from one or more inlets to one or more exhaust openings formed in the retort chamber.

6. The method as claimed in claim 5, further comprising imparting at least horizontal forces on the granules moving through the chamber such that the granules are moved towards the wall of the retort chamber for facilitating the heat exchange to the particles through the wall of the retort chamber.

7. The method as claimed in claim 6, further comprising imparting at least the horizontal forces such that turbulent mixing of the superheated steam and the granules is facilitated.

8. The method as claimed in claim 5, further comprising separating of the superheated steam from the granules prior to the superheated steam exiting the retort chamber through the exhaust openings.

9. The method as claimed in claim 5, wherein the calcination reaction occurs at a temperature of about 500 to 650° C.

10. The method as claimed in claim 5, wherein a residence time of the feedstock in the retort is of the order of seconds.

11. The method as claimed in claim 5, further comprising providing a pumping action to facilitate an exhaust flow from the retort chamber through the exhaust openings.

\* \* \* \* \*